United States Patent
Schipper et al.

(10) Patent No.: US 10,900,339 B2
(45) Date of Patent: Jan. 26, 2021

(54) FORMING MINERAL IN FRACTURES IN A GEOLOGICAL FORMATION

(71) Applicant: Saudi Arabian Oil Company, Dhahran (SA)

(72) Inventors: Desmond Schipper, Houston, TX (US); Katherine Leigh Hull, Houston, TX (US); Mohammad Hamidul Haque, Katy, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/392,420

(22) Filed: Apr. 23, 2019

(65) Prior Publication Data

US 2020/0340342 A1 Oct. 29, 2020

(51) Int. Cl.
| | | |
|---|---|---|
| *E21B 43/267* | (2006.01) | |
| *C09K 8/80* | (2006.01) | |
| *C21B 13/00* | (2006.01) | |
| *C09K 8/72* | (2006.01) | |

(52) U.S. Cl.
CPC .............. *E21B 43/267* (2013.01); *C09K 8/72* (2013.01); *C09K 8/80* (2013.01); *C21B 13/00* (2013.01)

(58) Field of Classification Search
CPC .......... E21B 43/267; C09K 8/80; C21B 13/00
See application file for complete search history.

(56) References Cited

U.S. PATENT DOCUMENTS

| | | | |
|---|---|---|---|
| 3,284,281 A | | 11/1966 | Thomas |
| 3,616,855 A | * | 11/1971 | Colgate .................. E21B 43/24 166/283 |
| 3,807,557 A | | 4/1974 | Miller |
| 3,912,330 A | * | 10/1975 | Carnahan ................ E21B 43/28 299/4 |
| 3,926,575 A | | 12/1975 | Meyers |
| 3,996,062 A | | 12/1976 | Frost |
| 4,043,599 A | * | 8/1977 | Lingane .................. C22B 3/06 299/4 |
| 4,043,885 A | | 8/1977 | Yen et al. |
| 4,223,726 A | | 9/1980 | Cha |
| 4,289,639 A | | 9/1981 | Buske |
| 4,324,560 A | | 4/1982 | Fonseca |
| 4,381,950 A | | 5/1983 | Lawson |
| 4,594,170 A | | 6/1986 | Brown et al. |
| 4,640,692 A | | 2/1987 | Audeh |

(Continued)

FOREIGN PATENT DOCUMENTS

| | | |
|---|---|---|
| WO | WO2004/005435 | 1/2004 |
| WO | WO2013/149122 | 10/2013 |

(Continued)

OTHER PUBLICATIONS

Gulf Cooperation Council Examination Report issued in GCC Application No. GC 2016-31980 dated Sep. 24, 2018, 4 pages.

(Continued)

*Primary Examiner* — Silvana C Runyan
(74) *Attorney, Agent, or Firm* — Fish & Richardson P.C.

(57) ABSTRACT

A system and method for forming mineral or proppant in-situ in fractures in a geological formation via a fracturing fluid. The mineral or proppant is formed from rock in the geological formation.

39 Claims, 14 Drawing Sheets

(56) References Cited

U.S. PATENT DOCUMENTS

| | | | |
|---|---|---|---|
| 5,232,490 A * | 8/1993 | Bender | C22B 3/08 |
| | | | 423/27 |
| 6,138,760 A | 10/2000 | Lopez et al. | |
| 6,488,091 B1 | 12/2002 | Weaver | |
| 6,494,263 B2 | 12/2002 | Todd | |
| 6,866,048 B2 | 3/2005 | Mattox | |
| 6,989,391 B2 | 1/2006 | Funkhouser | |
| 7,770,647 B2 * | 8/2010 | Watson | E21B 43/267 |
| | | | 166/308.3 |
| 8,225,866 B2 | 7/2012 | Rouffignac et al. | |
| 8,851,177 B2 | 10/2014 | Wigand | |
| 8,865,482 B2 | 10/2014 | Wang et al. | |
| 8,936,089 B2 | 1/2015 | Wigand | |
| 9,033,033 B2 | 5/2015 | Thomas et al. | |
| 9,834,721 B2 | 12/2017 | Chang et al. | |
| 9,863,231 B2 | 1/2018 | Hull et al. | |
| 10,329,478 B2 | 6/2019 | Schnoor et al. | |
| 10,351,758 B2 | 7/2019 | Hull et al. | |
| 10,472,555 B2 | 11/2019 | Hutchins et al. | |
| 10,479,927 B2 | 11/2019 | Hull et al. | |
| 2004/0101457 A1 * | 5/2004 | Pahlman | B01J 20/06 |
| | | | 423/50 |
| 2007/0298979 A1 | 12/2007 | Perry et al. | |
| 2008/0070806 A1 | 3/2008 | Lin et al. | |
| 2009/0044945 A1 * | 2/2009 | Willberg | C09K 8/706 |
| | | | 166/308.1 |
| 2009/0143252 A1 | 6/2009 | Lehmann | |
| 2009/0203557 A1 | 8/2009 | Barnes et al. | |
| 2009/0313772 A1 | 12/2009 | Talley | |
| 2010/0010106 A1 | 1/2010 | Crews | |
| 2010/0258265 A1 | 10/2010 | Karanikas et al. | |
| 2010/0276142 A1 | 11/2010 | Skildum et al. | |
| 2012/0247774 A1 | 10/2012 | Li et al. | |
| 2013/0056213 A1 | 3/2013 | Medvedev et al. | |
| 2013/0160994 A1 | 6/2013 | Alsop et al. | |
| 2013/0161002 A1 | 6/2013 | Wigand | |
| 2014/0045732 A1 | 2/2014 | Mazyar | |
| 2014/0374104 A1 | 12/2014 | Kushal | |
| 2015/0300140 A1 | 10/2015 | Eoff et al. | |
| 2016/0061017 A1 * | 3/2016 | Nguyen | E21B 43/267 |
| | | | 166/280.2 |
| 2016/0289543 A1 * | 10/2016 | Chang | C09K 8/64 |
| 2016/0362965 A1 | 12/2016 | Parlar | |
| 2017/0066959 A1 | 3/2017 | Hull | |
| 2018/0112126 A1 | 4/2018 | Yang et al. | |

FOREIGN PATENT DOCUMENTS

| | | |
|---|---|---|
| WO | WO 2015041669 | 3/2015 |
| WO | WO 2016089813 | 6/2016 |
| WO | WO 2017161157 | 9/2017 |
| WO | WO 2018118024 | 6/2018 |
| WO | WO 2018170065 | 9/2018 |

OTHER PUBLICATIONS

Gulf Cooperation Council Examination Report issued in GCC Application No. GC 2016-31980 dated Jan. 19, 2019, 4 pages.

International Search Report and Written Opinion of the International Searching Authority issued in International Application No. PCT/US2016/049958 dated Nov. 23, 2016; 10 pages.

International Search Report and Written Opinion issued in International Application No. PCT/US2017/049866 dated Dec. 1, 2017; 11 pages.

Hydraulic Fracturing Fluid Product Compoment Information Disclosure; 2 pages.

Montgomery, "Chapter 2: Fracturing Fluid Components," Intech open science | open minds, Montgomery, 2013, 21 pages.

Daneshy, "Hydraulic Fracturing to Improve Production," Tech 101, TheWayAhead, vol. 6, No. 3, Oct. 2010, 4 pages.

Brochard et al., "Fracture Properties of Kerogen and Importance for Organic-Rich Shales," Annual World Conference on Carbon (Carbon 2013), Jul. 2013, 5 pages.

Wang et al. Iron Sulfide Scale Dissolvers: How Effective Are They?, SPE 168063, Society of Petroleum Engineers, presented at the SPE Saudi Arabia section Annual Technical Symposium and Exhibition, May, 19-22, 2013, 22 pages.

Communication under Rule 71(3) EPC issued in European Application No. 16767088.4 dated Nov. 26. 2019, 50 pages.

Gulf Cooperation Council Examination Report issued in GCC Application No. GC 2017-33918 dated Nov. 17, 2019, 6 pages.

PCT International Search Report and Written Opinion issued in International Appln. No. PCT/US2020/029324, dated Oct. 30, 2020, 21 pages.

* cited by examiner

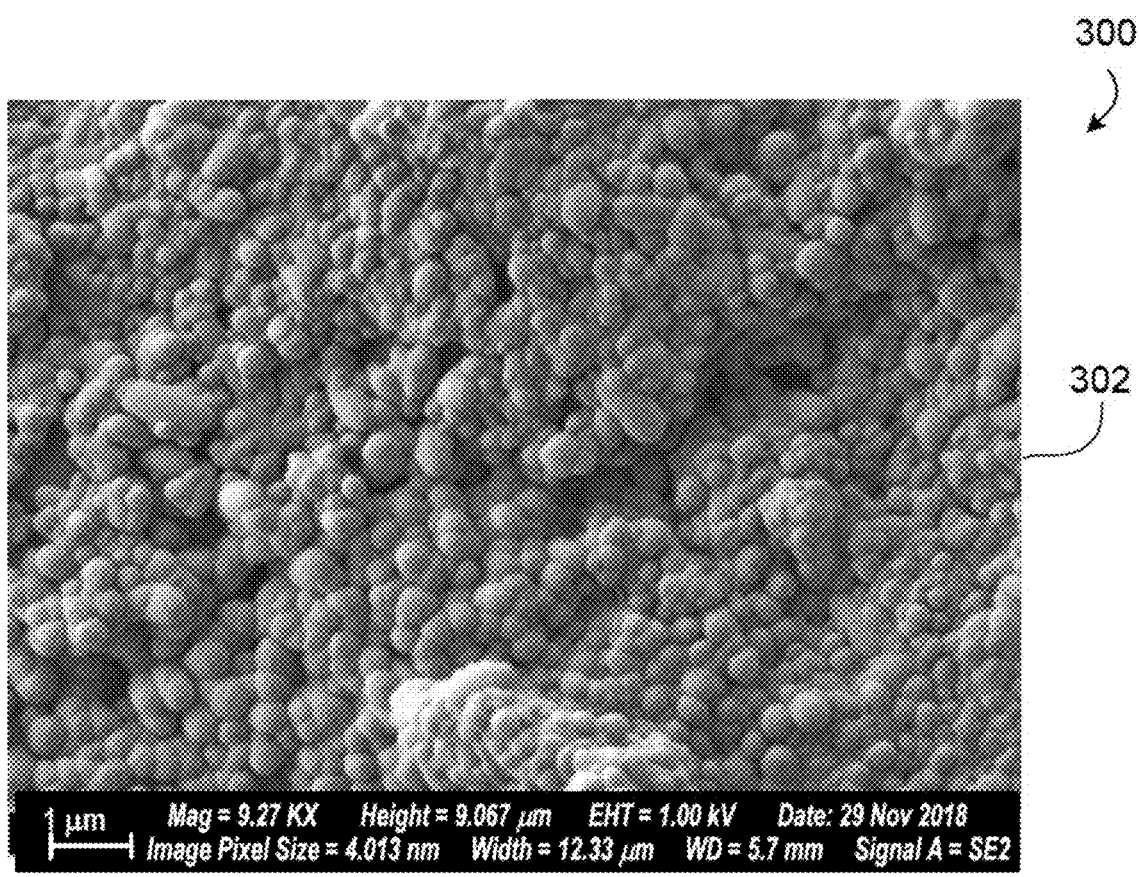
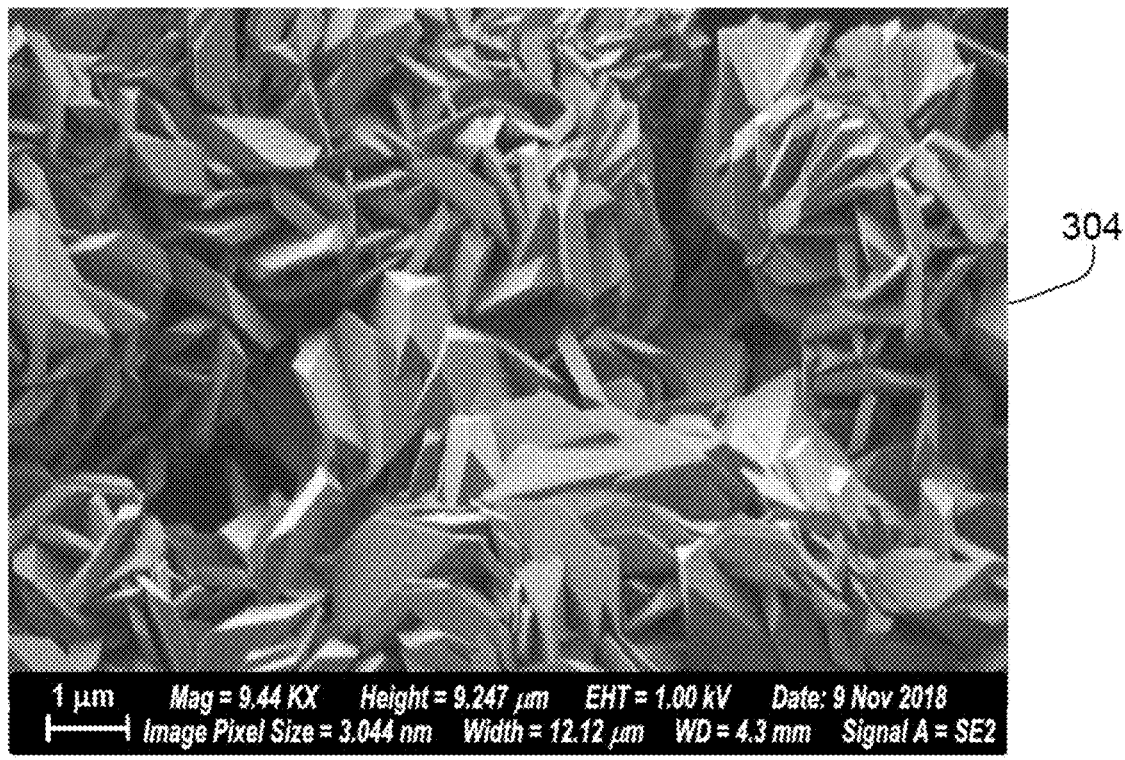
FIG. 3

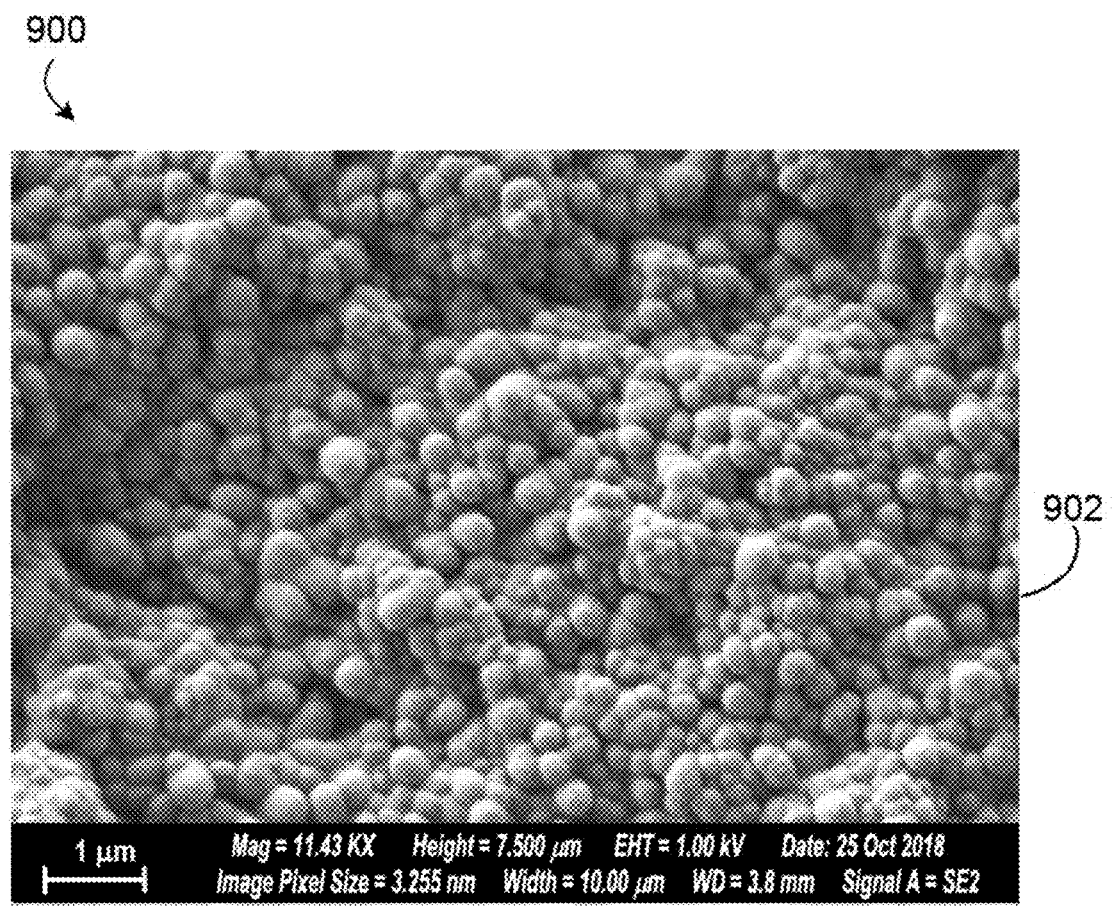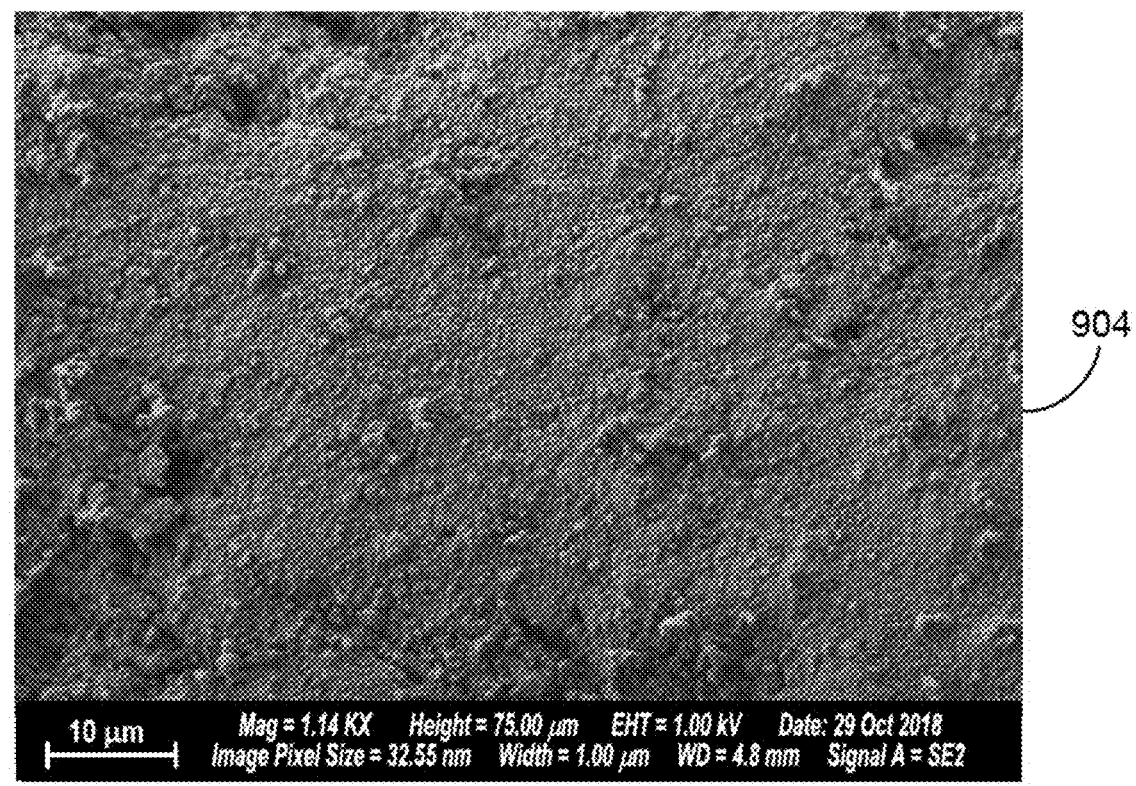
FIG. 9

FORMING MINERAL IN FRACTURES IN A GEOLOGICAL FORMATION

TECHNICAL FIELD

This disclosure relates to hydraulic fracturing of a geological formation.

BACKGROUND

Hydraulic fracturing employs fluid and material to generate fractures in a geological formation in order to stimulate production from oil and gas wells. Hydraulic fracturing is a well-stimulation technique in which rock is fractured by a pressurized liquid. The process can involve the injection of fracturing fluid into a wellbore to generate cracks in rock formations through which natural gas, petroleum, and brine will flow more freely. The fracturing typically generates paths that increase the rate at which production fluids can be produced from the reservoir formations. Hydraulic fracturing may increase the flow of oil or natural gas from a well. The amount of increased production may be related to the amount of fracturing. Proppants may be employed to maintain the fractures open as pressure decreases in the well.

Hydraulic fracturing may allow for the recovery of oil and natural gas from unconventional formations (for example, shale formations) that geologists once believed were impossible to produce. Hydraulic fracturing may be employed in rocks such as sandstone, shale, and coal beds to increase crude oil or gas flow to a well from petroleum-bearing rock formations. A beneficial application may be horizontal wellbores or deviated wellbores in unconventional geological formations having hydrocarbons such as natural gas and crude oil. Proppants may be conveyed from the surface in the fracturing fluid to the hydraulic fractures.

SUMMARY

An aspect relates to a method of forming proppant in-situ in a geological formation. The method includes injecting a fracturing fluid through a wellbore into the geological formation and hydraulically fracturing the geological formation with the fracturing fluid to generate fractures in the geological formation. The method includes forming proppant in situ in the fractures via the fracturing fluid. The proppant is formed from rock in the geological formation.

Another aspect relates to a method of forming a mineral in a geological formation, including pumping a fracturing fluid through a wellbore into the geological formation, and hydraulically fracturing the geological formation with the fracturing fluid to generate fractures in the geological formation. The method includes forming the mineral on rock in the fractures. The mineral is formed from the rock via the fracturing fluid.

Yet another aspect relates to a method of forming proppant in-situ in a geological formation, including injecting a fracturing fluid through a wellbore into the geological formation, and hydraulically fracturing rock in the geological formation with the fracturing fluid to generate fractures in the geological formation. The method includes leaching ions from the rock via the fracturing fluid, and forming the proppant from the ions.

Yet another aspect relates to a method of forming proppant in situ in a geological formation, including injecting a fracturing fluid through a wellbore into the geological formation, and hydraulically fracturing rock in the geological formation with the fracturing fluid to generate fractures in the geological formation. The method includes forming proppant in situ in the fractures by oxidative leaching of the rock via the fracturing fluid.

Yet another aspect relates to a hydraulic fracturing system including a vessel holding a fracturing fluid. The system includes a pump (or plurality of pumps) to provide the fracturing fluid from the vessel through a wellbore into a geological formation to hydraulically fracture rock in the geological formation to generate fractures in the geological formation. The system includes a control component to modulate an addition rate of an oxidizer to the fracturing fluid in the vessel. The system includes a control system to adjust a set point of the control component to change a concentration of the additive in the fracturing fluid in response to a timing of the hydraulic fracturing or to alter a property of a mineral matrix formed in the fracture via the fracturing fluid, or a combination thereof.

The details of one or more implementations are set forth in the accompanying drawings and the description to be presented. Other features and advantages will be apparent from the description and drawings, and from the claims.

BRIEF DESCRIPTION OF DRAWINGS

FIG. 3 are scanning-electron micrographs which are scanning electron microscope (SEM) images.

FIG. 9 is an SEM image at two magnifications of the hematite produced from the shale rock in Example 2.

Like reference numbers and designations in the various drawings indicate like elements.

DETAILED DESCRIPTION

Figure 1:
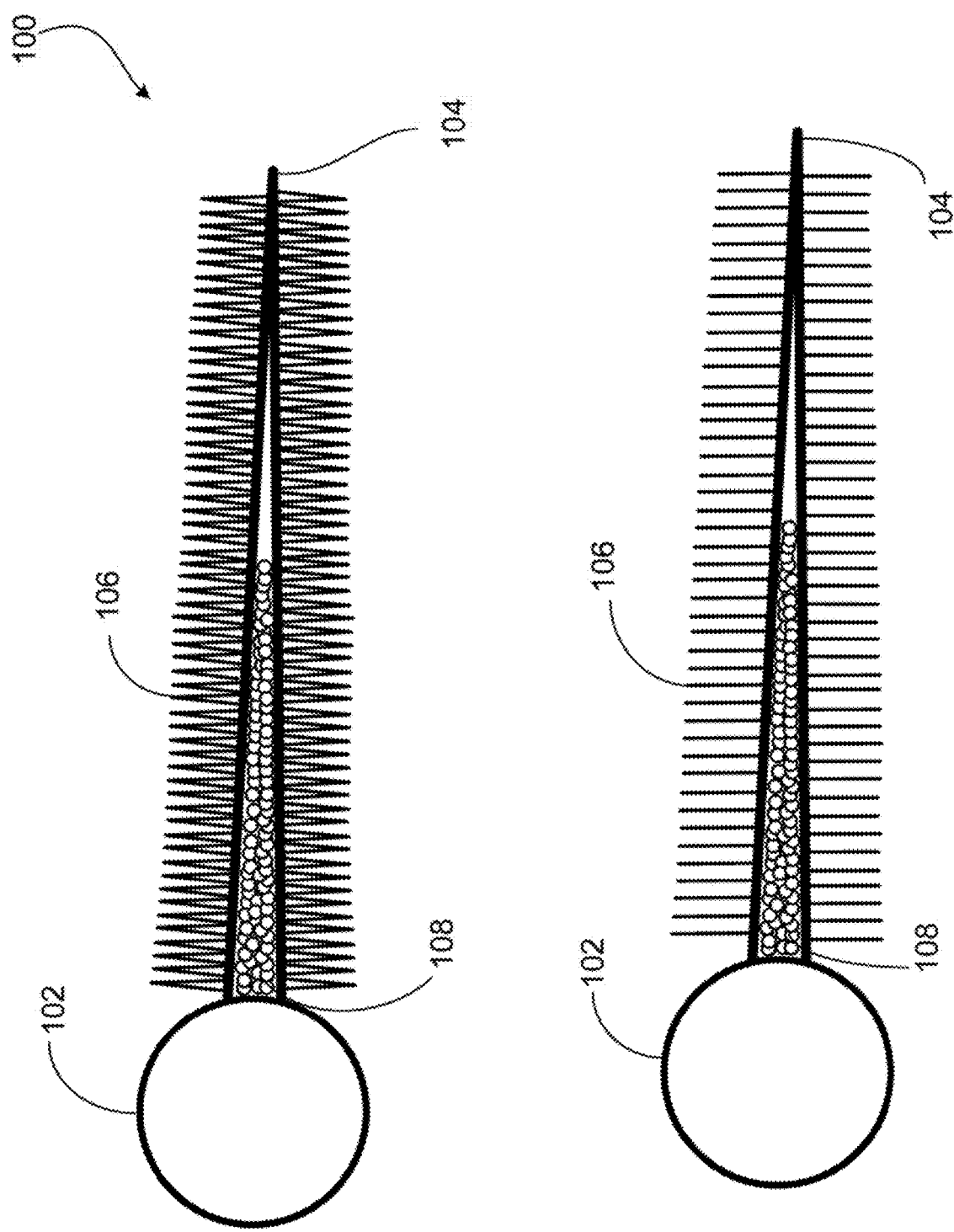
FIG. 1 is a sequence diagram of a wellbore with an associated primary fracture.

Unconventional reservoirs can include formations containing shale, sandstone, and coal beds. Unconventional formations can have a permeability of less than 1 millidarcy. The hydraulically fracturing of these formations typically forms a complex fracture network of fractures surrounding the wellbore. The fractures can include primary fractures and secondary microfractures. The microfractures can extend from a primary fracture outwardly in a branching tree-like manner. These dendritic microfractures can be both near-wellbore and far field. Consequently, the secondary fractures or microfractures can give more depth and breadth to the fracture network. Conventional or traditional proppant particulates (for example, having particle size greater than 150 microns) are typically too large to enter and prop open the microfractures. In the absence of sufficiently small proppant particulates (for example, less than 150 microns), the microfractures tend to close back once the hydraulic pressure placed on the formation is released or decreased. Allowing the microfractures to close eliminates a portion of the fracture network and reduces the production of hydrocarbons.

Present embodiments beneficially grow proppant in fractures including in microfractures and in the far field. Traditional proppant cannot penetrate as deeply. With the present techniques, the pumping of a single-phase carrier fluid and the accessibility of far-field microfractures and nanofractures can be advantageous. Traditional fluid with proppant is multi-phase (slurry), and the application can suffer with settling of the proppant. Conversely, present embodiments promote transport including to reach far field. Rock volumes can be near wellbore (for example, less than 10 feet from wellbore), mid-field (for example, 10 feet to 100 feet from wellbore), and far field (for example, greater than 100 feet from wellbore).

This disclosure relates to forming (for example, growing) a mineral from rock (for example, shale rock) in a geological formation. The formed mineral may act as a proppant. Some aspects of the present disclosure are directed to growth of minerals on shale rocks by tandem oxidative leaching and hydrothermal synthesis for use of the grown minerals as proppants. The proppants may be labeled as "petrogenic" proppants, which are proppants formed from rock. Minerals grown from shale rock can be used as proppant. The proppant can be grown directly on the rock surface to overcome problems associated with traditional proppant. Those problems can include the difficulty that traditional proppant may have flowing around bends or corners in the wellbore or fractures. The problems can include the typical inability of traditional proppant to intrude into natural and secondary fractures. The inability of conventional proppant to reach into the fractures may limit the amount of stimulated reservoir volume available.

By contrast, present embodiments of the rock treatment produce the petrogenic proppant in situ in the geological formation from the rock in the geological formation. The fractures may be widened by digestion of some fraction of the rock and then some portion of the removed rock converted into the proppant in situ. In some applications, the rock treatment may enhance the porosity of the reservoir by etching the rock. Moreover, the rock treatment may harden the fracture walls leading to less proppant embedment.

Embodiments provide for formation of minerals on the shale rock surface due to the effects of the rock treatment. In implementations, the type of mineral grown generally depends on the shale rock composition. Rock mineralogy may be a determinant or primary determinant of what mineral is grown. Properties of the petrogenic proppant can be tuned by varying the rock treatment solution. In certain embodiments, the morphology of the petrogenic proppant can be controlled by compositional changes to the rock treatment solution. The composition of the treatment solution for the rock may adjusted or specified.

Embodiments provide for a partial replacement of the pumping of proppants because of the in-situ formation of mineral proppants. For instance, the amount of pumped proppants may be reduced by 5% to 70% by weight or volume for certain frac jobs. Moreover, some in-situ implementations of mineral growth in the present discussion are directed to formation of small mesh micro-proppants, for example, 100 mesh (150 μm), 200 mesh (75 μm), 400 mesh (35 μm), 635 mesh (20 μm), and smaller. These "in-situ grown" or "newly generated" mineral proppants, which are not pre-existing in the reservoir or pumped from surface, serve as proppants by keeping the fracture path open for hydrocarbon production. Thus, as mentioned, certain embodiments reduce the total amount of proppant to be pumped from surface because the group(s) of minerals formed in-situ serve as proppant. The minerals may be formed in-situ by treatment fluid having the oxidizer when the treatment fluid comes across or is exposed to rock in the geological formation. For instance, the iron oxyhydroxide and sulfate groups of minerals serving the purpose of proppants may be generated in-situ by the treatment fluid containing the oxidizer when the treatment fluid contacts iron-containing shale in the geological formation. The iron (III) oxide-hydroxide group may encompass a number of oxide-hydroxides of iron. The sulfate group of minerals may be a class of minerals that include the sulfate ion ($SO_4^{2-}$) within their structure.

In implementations, the mineral matrix is grown in-situ of varying heights and geometries in fracturing applications from larger mesh (for example, mineral grains greater than 150 μm particle size) in near wellbore to smaller mesh (for example, mineral grains of less than 150 μm particle size) in far field. Timing the generation of the mineral matrix that is a petrogenic proppant matrix as proppants may be within the first 2 hours (or first 3 hours or first 4 hours) after pumping the fracturing treatment fluid having oxidizer. The adjusting of the timing of injecting the treatment fluid may be to generate the mineral matrix having a "spatial gradient" that provides varied permeability between the near wellbore to far field in the fracturing application. Certain embodiments adjust the composition of the treatment fluid to generate the mineral matrix (petrogenic proppant) of varying packing density to provide varying permeabilities from near wellbore to far field in the fracturing application.

Some embodiments prevent or reduce embedment by external proppant. Externally pumped proppant could embed in the reservoir matrix due to mismatch in mechanical properties (for example, harder proppant on softer surface of the fracture) causing reduction in fracture width and hence reduction in hydrocarbon conductivity. Controlled growth of the mineral layer on fractured surface may give additional hardness by the mineral matrix to prevent or reduce proppant embedment. As an example, consider a monolayer of 40/70-mesh traditional proppant when not embedded leaving a fracture width 200-400 μm. This fracture width can be reduced when the traditional proppant embeds. A mineral layer (for example, 5-20 μm) formed on the fractured surface prior to settling of the external proppant may provide a landing surface for the proppant and thus provide for retaining approximately the original 200-400 μm fracture width. The mineral layer may reduce damage caused by proppant embedment.

This proppant replacing technology may mitigate issues of "proppant transport" properties. The transport property of proppant is suspension of the proppant within the fracturing treatment fluid without settling down due to the proppant weight. A non-ceramic proppant typically has a better transport property than ceramic proppant because the non-ceramic proppant typically weighs less than ceramic proppant. Fracture treatment fluid not containing proppant particles is even more efficient in transport through the fracture network. Implementations eliminate the need for the transport property at least for the part where the traditional proppant is replaced. The in-situ proppant can be grown directly on the rock surface to overcome problems associated with conventional proppant such as (1) the difficulty that conventional proppant has flowing around bends or corners, (2) issues with pressure dependent leak-off (PDL), and (3) the inability of traditional proppant to intrude deep (for example, greater than 50 feet) into natural and secondary fractures.

Proppant or propping agents can be essential to the efficacy of hydraulic fracturing as the proppant functions to hold open the hydraulically-generated (induced) fractures. The extent to which the induced fractures can be held open can affect well production capability. Placement of traditional proppants in petroleum reservoirs is an ongoing challenge. Size of pumped proppant may prevent the proppant from entering secondary fractures or microfractures. A particular problem for pumped proppant is some inability for the flowing proppant to get around corners. Furthermore, pumped proppant tends to settle (for example, particularly in slickwater systems) in the lower part of the vertical profile of the fracture network. The distribution of pumped proppant is typically uneven.

Present embodiments may reduce proppant loadings and proppant size. Embodiments may increase stimulated reservoir volume, increase complexity and productivity of hydraulically fractured networks, and increase total recovery of a well.

FIG. 1 is a sequence diagram 100 of a wellbore 102 with associated primary fracture 104. FIG. 1 illustrates that most secondary fractures 106 may close after the pressure applied during hydraulic treatment is relieved. Thus, the conductivity of the secondary fractures 106 may decrease. The diagram 100 is a schematic of a hydraulic fracture having a primary fracture 104 and secondary fractures 106. The top of the sequence schematic depicts immediately before the end of a traditional frac job with conventional proppant 108. The bottom portion of the schematic depicts after completion of the traditional frac job and with the secondary fractures 106 closed as the hydraulic fracturing pressure is relieved 110.

The size of most conventional small proppant is at least 100 microns ($\mu m$) and thus generally unable to enter nanofractures and typical microfractures. In contrast, petrogenic proppant (which can form in microfractures) places petrogenic proppant particles (for example, size of 200 nanometers (nm) to 2 $\mu m$) where the particles can have impact. If these microfractures can be efficiently propped open, production from far deeper (for example, greater than 100 feet) in the reservoir than generally has been experienced before may be possible. This results in increased stimulated-reservoir volume.

Figure 2:
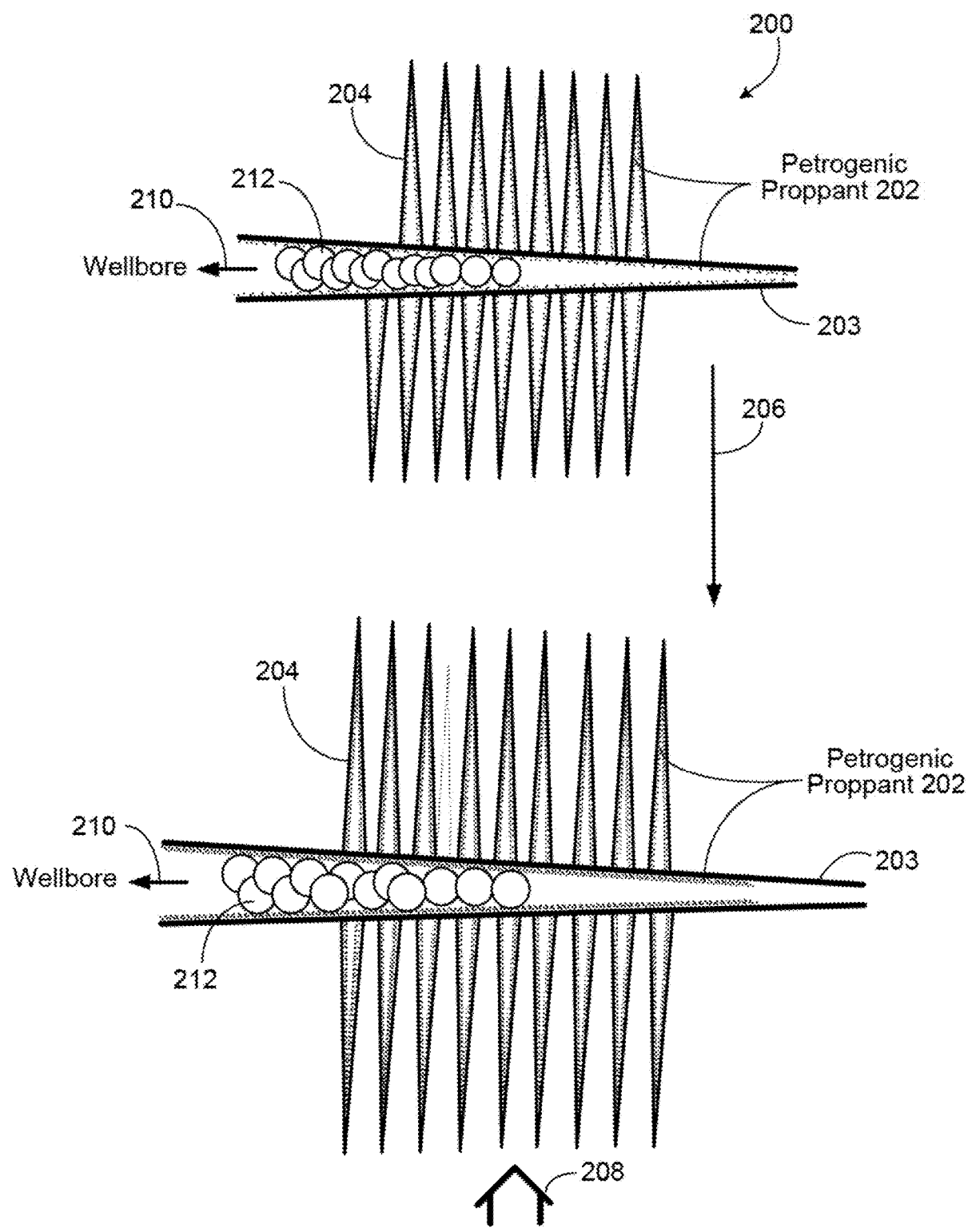
FIG. 2 is a sequence diagram of a hydraulic fracture having petrogenic proppant as formed in situ.

FIG. 2 is a sequence diagram 200 of a hydraulic fracture having the innovative petrogenic proppant 202 as formed in situ. In the illustrated embodiment, the hydraulic fracture has a primary fracture 203 and secondary fractures 204. The secondary fractures 204 may include microfractures. The top portion of the schematic is the hydraulic fracture before end of the frac job utilizing the petrogenic proppant 202. The bottom portion of the schematic is after completion 206 of the frac job utilizing the petrogenic proppant 202. The secondary fractures 204 are held open by the petrogenic proppant 202 after the frac job is over, which allows increased flow of hydrocarbons 208 from the fractured reservoir matrix of the geological formation to the wellbore 210. Lastly, externally pumped proppant 212 may be disposed in the primary fracture 203.

A further problem that petrogenic proppant may address or solve is that of pressure dependent leak-off in which a relatively large fraction (for example, 75% by volume or weight) of fracturing-fluid water soaks into the secondary fractures or microfractures during the fracturing treatment not to return because the water gets trapped. With employment of petrogenic proppant, the microfractures can be held open and thus the water may return to the surface where the water can be reused.

Embodiments of the present techniques are a system and method by which mineral grains can be grown on a rock surface by tandem oxidative leach-hydrothermal synthesis. An action may be to expose rock in the geological formation to an oxidizing, acidic solution at elevated temperature (for example, at least about 150° C.). The oxidizing, acidic solution may be rock treatment solution or in a fracturing fluid. This solution may attack into the rock with focus on redox sensitive elements (for example, $Fe^{2+}$, $S_2^-$, $S^-$). The oxidizing conditions may convert $Fe^{2+}$ in the rock to $Fe^{3+}$ soluble in the solution and convert $S_x^-$ in the rock to $SO_4^-$ soluble in the solution. As this occurs, $Fe^{3+}$-based minerals may begin to precipitate hydrothermally from the solution as polycrystalline or single-crystalline materials. The crystalline materials may precipitate as a layer or with particle sizes ranging, for example, from 200 nm to 2 $\mu m$. The layers of the crystalline materials can be, for example, one to two particles giving a layer thickness in a range of 2 nm to 4 $\mu m$. The $Fe^{3+}$-based minerals formed and precipitated may include hematite, jarosite, lepidocrocite, and ferrihydrite.

A particular implementation of the rock treatment solution is an oxidizing acidic solution having aqueous KCl (for example, 2 wt %) with $NaBrO_3$ (for example, 13.3 millimolar (mM)) and $(NH_4)_2S_2O_8$ (for example, 8.8 mM). The ammonium and bromate react at geological formation temperatures to produce an acidic solution retaining oxidizing power. The resulting solution may etch the rock to increase rock porosity and widen natural fractures. Minerals susceptible to attack by the rock treatment solution (leaching) include siderite ($FeCO_3$), pyrite ($FeS_2$), marcasite ($FeS_2$), pyrrhotite ($Fe^{1-x}S$), chlorite group minerals (for example, chamosite or (($Fe_5Al$)($AlSi_3$)$O_{10}$($OH$)$_8$) in particular), clays illite, marcasite, mica, and ankerite ($Ca(Fe,Mg,Mn)(CO_3)_2$). Concertedly or minimally temporally separated (for example, less than 10 seconds), the fresh mineral grains (or petrogenic proppant) may begin to nucleate and grow on the rock surface.

Implementations may work by leaching predominantly iron and sulfur from minerals (in the rock) into the formation fluid (or fracturing fluid) where the iron and sulfur hydrothermally convert to a mineral(s). As discussed later, the minerals so produced in Examples in the laboratory utilizing respective shale rock samples were ferrihydrite, hematite, and jarosite. These three minerals grown on the respective shale samples will be stable under reservoir conditions and can be utilized as proppant formed in situ on shale rock in a geological formation. Other minerals may be grown for the proppant.

FIG. 3 are scanning-electron micrographs 300 that are scanning electron microscope (SEM) images for the Examples 1 and 2 to be presented later. The hematite image 302 is of the hematite mineral formed from a shale sample in Example 2. The jarosite image 304 is of jarosite mineral formed from another shale sample in Example 1. Both of these minerals may be characterized as petrogenic proppant grown from two different respective shales. The size and morphology of the minerals may be tunable via adjusting the composition (for example, amount of oxidizer and other components) of the fracturing fluid or treatment fluid. Additional minerals other than hematite and jarosite may be produced depending, for instance, on the type of shale rock.

Traditionally, proppant is pumped into the geological formation as a slurry of the proppant in the fracturing fluid. Maintaining the proppant suspended in the slurry has generally been achieved by increasing the viscosity of the fracturing fluid medium. However, in recent years, operators have transitioned to employing more slickwater-based systems which that less viscous (for example, less than 100 centipoise (cP)) and deliver the proppant to the formation by speed of fluid flow. In other words, the proppant is pushed into the formation by increased flow rate. In these slickwater treatments, a "proppant bank" forms (for example, a sand bank) which migrates along the bottom of the horizontal wellbore.

Both the more viscous fluids and the less-viscous slickwater fluids may suffer from proppant-related drawbacks. In the former, the greater viscosity (for example, greater than 100 centipoise (cP)) of the fluid to keep the proppant suspended adversely impacts the fracturing process. Even though proppant is carried further into the formation (albeit into primary fractures), the greater viscosity fluid generally gives less fractures. Therefore, overall the stimulated reservoir volume is less. As for the less-viscous fluid, the less viscosity of slickwater systems (for example, less than 100 cP) promotes fracture formation. However, proppant placement becomes an issue as the rate of fluid flow controls the placement. As the less-viscous fluid flows into the formation, the fluid speed will slow as the flow radiates away from the borehole to primary fractures and from primary fractures to secondary fractures. Thus, the pushing effect of the fluid diminishes, such that proppant will typically stop before the proppant reaches even the end of the hydraulically-induced primary fractures.

In contrast, present embodiments form proppant in situ deeper in the formation and without employing a greater viscosity fluid (for example, greater than 100 cP). Embodiments may be utilized with slickwater systems. In the growth of the proppant in the formation including in secondary fractures, the fracturing can be performed with fracturing fluid without conveyed proppant. External proppant can be subsequently conveyed in less-viscous fracturing fluid (for example, less than 100 cP) for primary fractures and for near-wellbore placement of the proppant.

The size of the proppant is related to the size of the channels the proppant can keep open. As hydraulically-induced primary fractures are on the order of millimeters in size at the opening, the proppant size utilized should accordingly be relatively large at millimeters in size. However, for smaller radial fractures connected to the primary fractures, the fracture widths are much smaller (micrometers) and traditional proppant is typically not known to enter such fractures even though secondary fractures can contribute hydrocarbon flow from the rock matrix to the primary fractures. Present embodiments provide for smaller proppant grown in situ in secondary fractures including microfractures and nanofractures.

Embodiments produces proppant (petrogenic proppant) out of the rock in situ in a way amenable to integration with existing slickwater systems. A slickwater-based fluid to which has been added an oxidizer (for example, ammonium persulfate and sodium bromate) for petrogenic proppant growth can be utilized with traditional proppant. In such a case, the faces of fractures in wells fracked with this fluid become templates for growth of the petrogenic proppant during the fracturing job. When the fracturing job is complete, the petrogenic proppant remains in the secondary fractures and regions of the primary fractures unreachable by traditional proppant (see, for example, FIG. 2). Thus, the stimulated reservoir volume may be increased.

Figure 4:
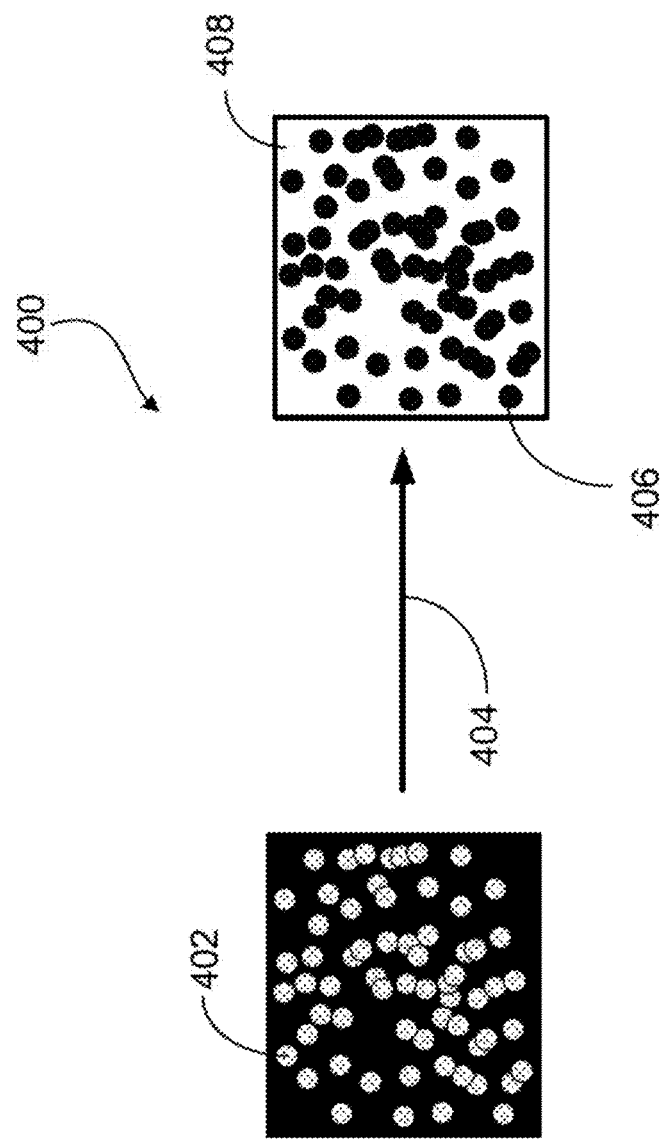
FIG. 4 is a diagrammatical representation of an origin of porosity in treated rock.

FIG. 4 is a diagrammatical representation 400 of an origin of porosity in treated rock with embodiments. A further advantage of the petrogenic proppant is that the petrogenic proppant may create porosity intrinsically. Porosity is a parameter of reservoir quality.

Shale rock 402 is rock containing iron and sulfur. Shale rock 402 is typically non-porous and generally impermeable having nano-Darcy permeability. The development of porosity may accompany the growth of the petrogenic proppant 408. The petrogenic proppant 408 is an iron(III)-based petrogenic proppant.

As the rock 402 is being reworked 404 (oxidative leaching) to generate the petrogenic proppant 408, rock iron and rock sulfur components are redistributed to the rock surface. Thus, pores 406 are generated in the rock by oxidative leaching 404 of shale rock 402. See also FIG. 5. The pores are formed from the leach process. The increase in porosity and likely permeability of the rock may increase hydrocarbon recovery.

The oxidative leaching 404 of the shale rock 402 both forms petrogenic proppant 408 on the shale rock 402 and generates pores 406 in the shale rock 402. Both can contribute to hydrocarbon production from and through the shale rock 402.

Figure 5:
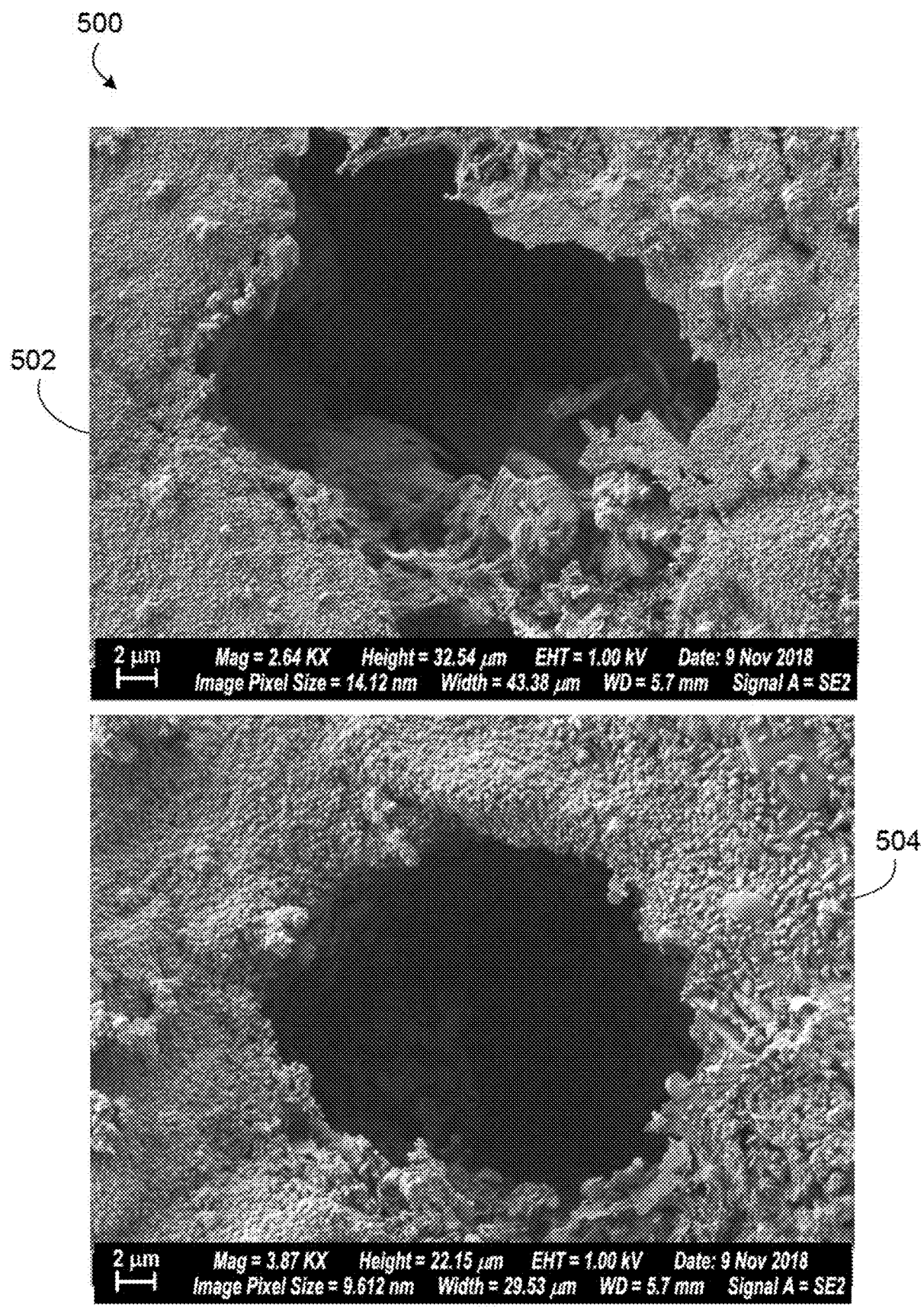
FIG. 5 is SEM images of treated shale rock samples.

FIG. 5 is SEM images 500 of treated shale rock samples including an image 502 of a treated shale rock sample and an image 504 of another treated shale rock sample. The treatment was oxidative leaching of the shale rock samples. As can be seen in the images 502 and 504, a pore is created in each sample by the oxidative leaching. While the oxidative leaching may be performed to generate ions from the shale rock for the hydrothermal synthesis of the petrogenic proppant, the oxidative leaching may also increase porosity of the shale rock.

Another advantage is that the shape and size of the petrogenic proppant can be tuned by varying the composition of the fracturing fluid. For instance, in Example 3 presented later, addition of excess potassium sulfate to fluid to treat a shale rock sample produced hematite spheres. The shale rock sample was the type of shale rock employed in both Example 2 and Example 3 presented later.

Figure 6:
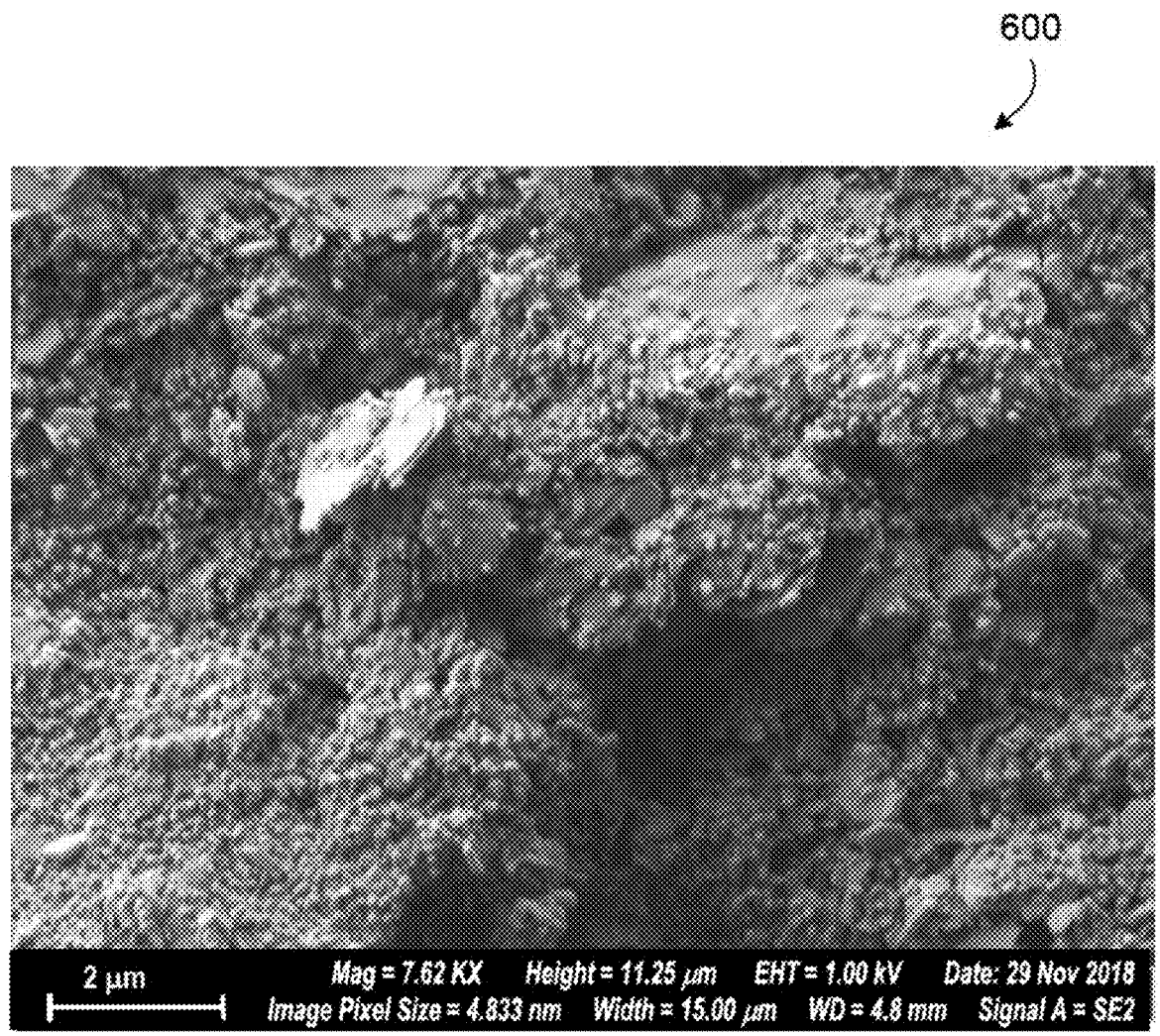
FIG. 6 is an SEM image depicting predominantly hexagonal hematite grown on the shale rock sample in the sulfate rich environment in Example 3.

FIG. 6 is an SEM image 600 depicting predominantly hexagonal hematite grown on the shale rock sample in the sulfate rich environment in Example 3. The addition of excess potassium sulfate to the leaching oxidation growth-treatment of shale rock produced hematite spheres on exposure to the treatment solution and gave faceted hematite hexagonal-particles, as depicted in the image 600. The morphology of the produced mineral was controlled by increasing concentration of the oxidizer or increasing concentration of sulfate in the treatment fluid. For the type of shale in the shale sample, jarosite was not produced as one might expect from with the $KFe_3(SO_4)_2(OH)_6$ formula for jarosite. The shale sample utilized was of the shale type (arbitrarily labeled as shale rock type B) employed in Examples 2 and 3 discussed later.

Example 1

The Examples are given as only examples and not meant to limit the present techniques. Example 1 is directed to the growth of jarosite. The type of shale rock of the shale rock sample for Example 1 was arbitrarily labeled as shale rock type A. The shale rock sample was treated with a 10 milliliter (mL) solution of 13 mM NaBrO$_3$, 8.7 mM (NH$_4$)$_2$S$_2$O$_8$, and 0.27 molar (M) KCl for 20 hours at 150° C. Jarosite formation was observed on the exposed faces (see images 706 and 708 in FIG. 7). The energy dispersive x-ray spectroscopy (EDS) spectrum is in agreement with a jarosite composition (see FIG. 8B).

Figure 7:
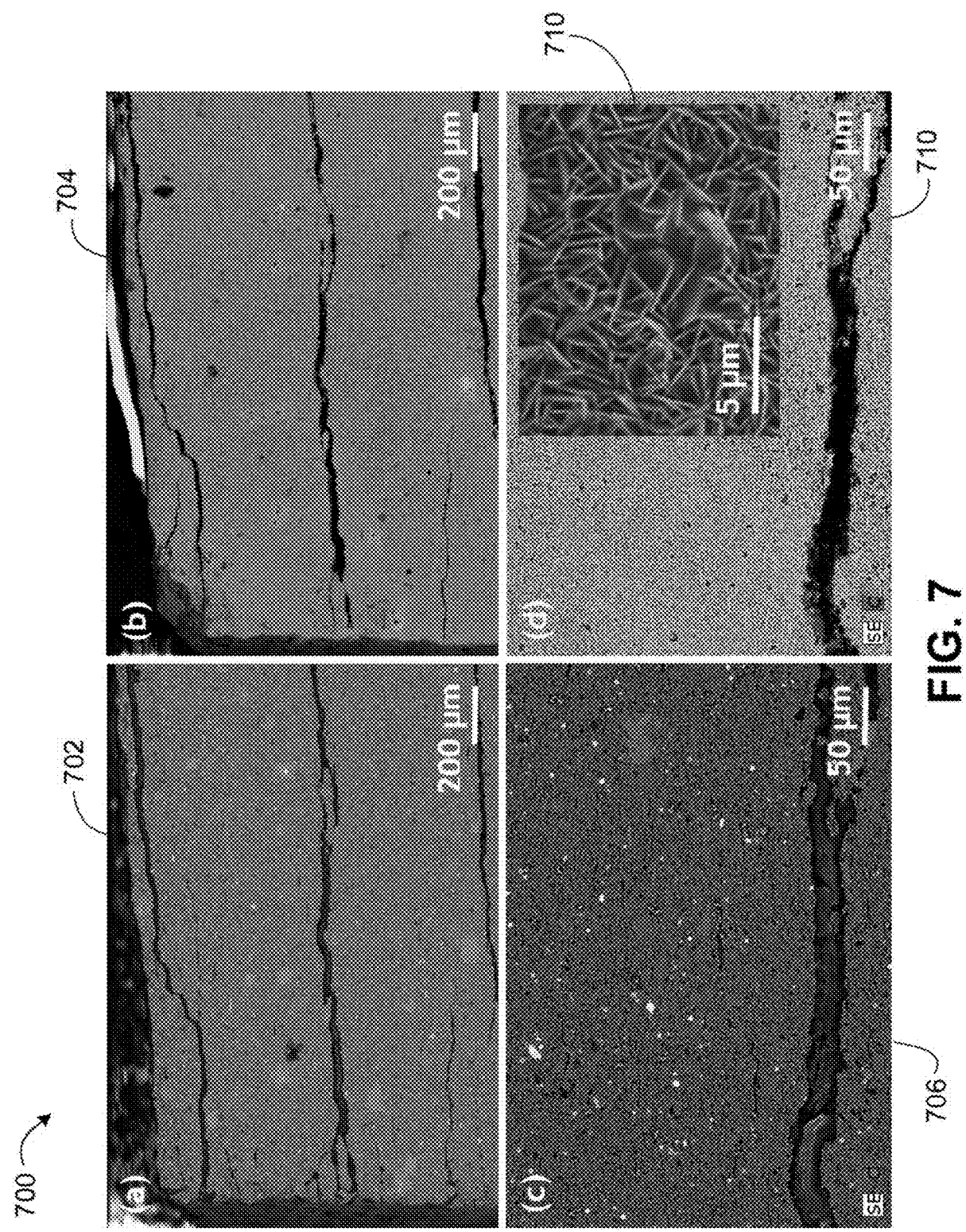
FIG. 7 is SEM images of a shale rock sample treated with the oxidizing solution in Example 1.

FIG. 7 is SEM images 700 of the shale rock sample treated with the oxidizing solution in Example 1. The SEM image (a) 702 and the SEM image (b) 704 are SEM images of the shale rock sample before the solution was applied. The SEM image (c) 706 and the SEM image (d) 708 are SEM images of the shale rock sample after the solution was applied and thus depict the shale rock sample as treated. The inset image is a magnified portion depicting jarosite grains 710 in the treated shale rock.

Figure 8A:
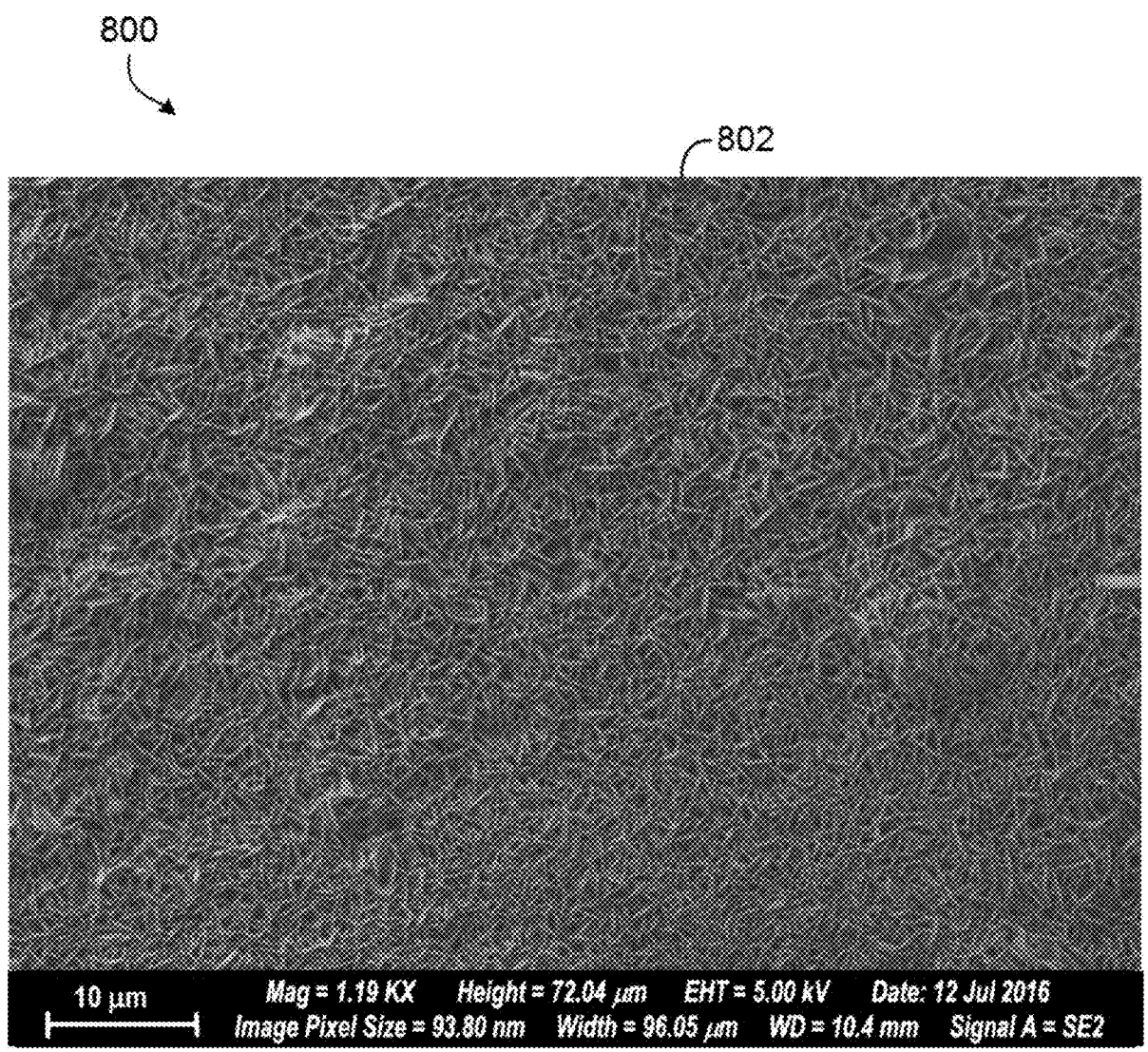
FIG. 8A is an SEM image of the jarosite produced on the shale rock in Example 1.

FIG. 8A is an SEM image 800 of the jarosite 802 produced on the shale rock in Example 1. The image 800 is zoomed-in as magnified.

Figure 8B:
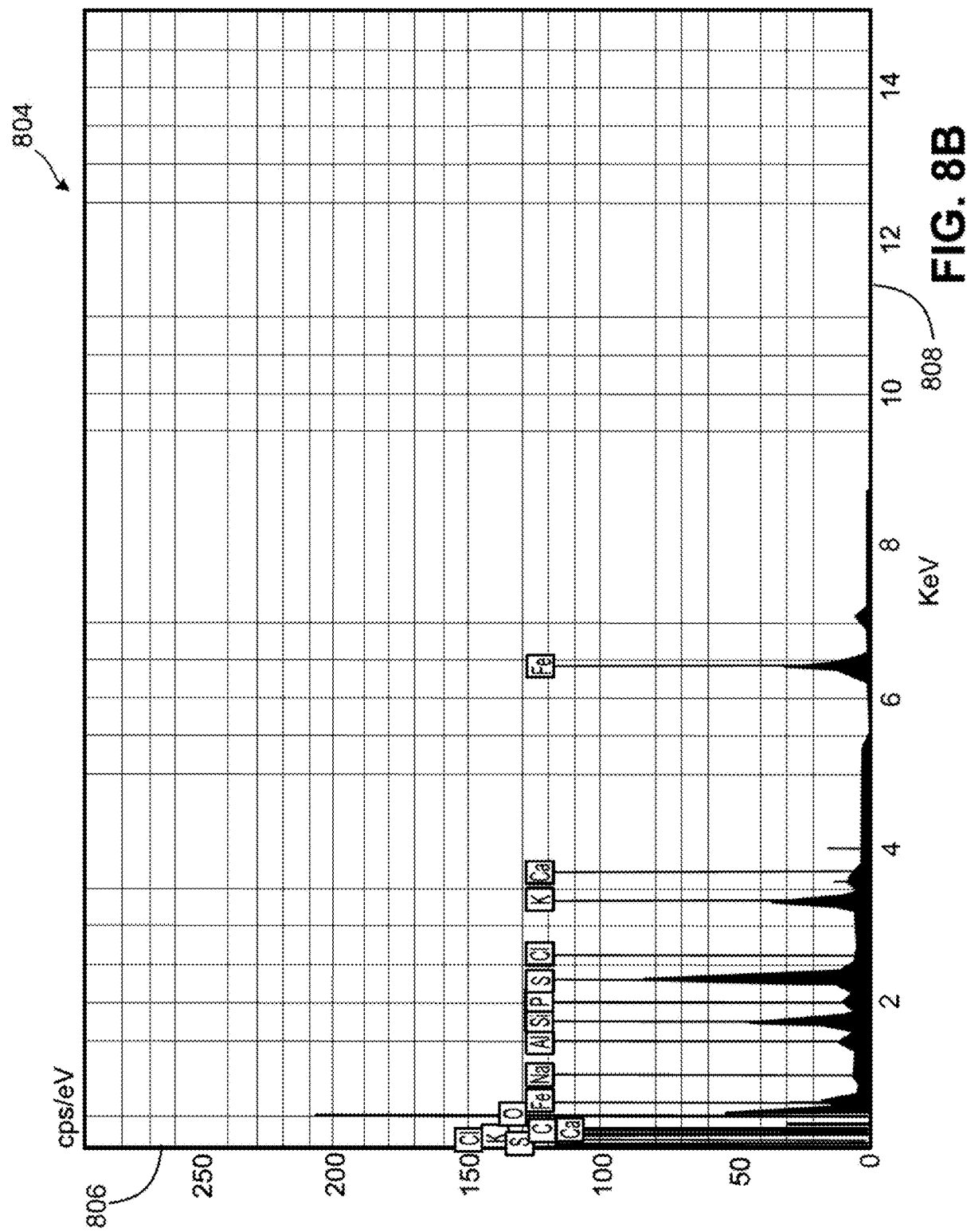
FIG. 8B is an EDS spectrum for the jarosite produced in Example 1.

FIG. 8B is the corresponding EDS spectrum 804 for the jarosite 802 produced. The EDS spectrum 804 is in agreement with a jarosite composition. The EDS spectrum 602 is a plot of x-ray counts 806 in counts per second per electron-volt (cps/eV) versus energy 808 in kiloelectron volts (keV).

Example 2

Example 2 is directed to growth of hematite. The type of shale rock of the shale rock sample for Example 2 was arbitrarily labeled as shale rock type B. As with Example 1, the shale rock sample in Example 2 was treated with a 10 mL solution of mL of 13 mM NaBrO$_3$, 8.7 mM (NH$_4$)$_2$S$_2$O$_8$, and 0.27 M KCl for 20 hours at 150° C.

Hematite formation was observed on the exposed faces, as shown in FIG. 9. FIG. 9 is an SEM image 900 of the hematite produced from the shale rock at two magnifications 902 and 904.

Example 3

Example 3 is directed to the effect of additional sulfate on hematite growth and which gave demonstration of shape control. A shale rock sample of shale rock type B was treated with a 10 mL solution of 13 mM NaBrO$_3$, 8.7 mM (NH$_4$)$_2$S$_2$O$_8$, 0.11 M K$_2$SO$_4$, and 0.27 M KCl for 20 hours at 150° C. Hematite formation was observed on the exposed faces of the shale rock sample shown in FIG. 6 discussed earlier.

Figure 10:
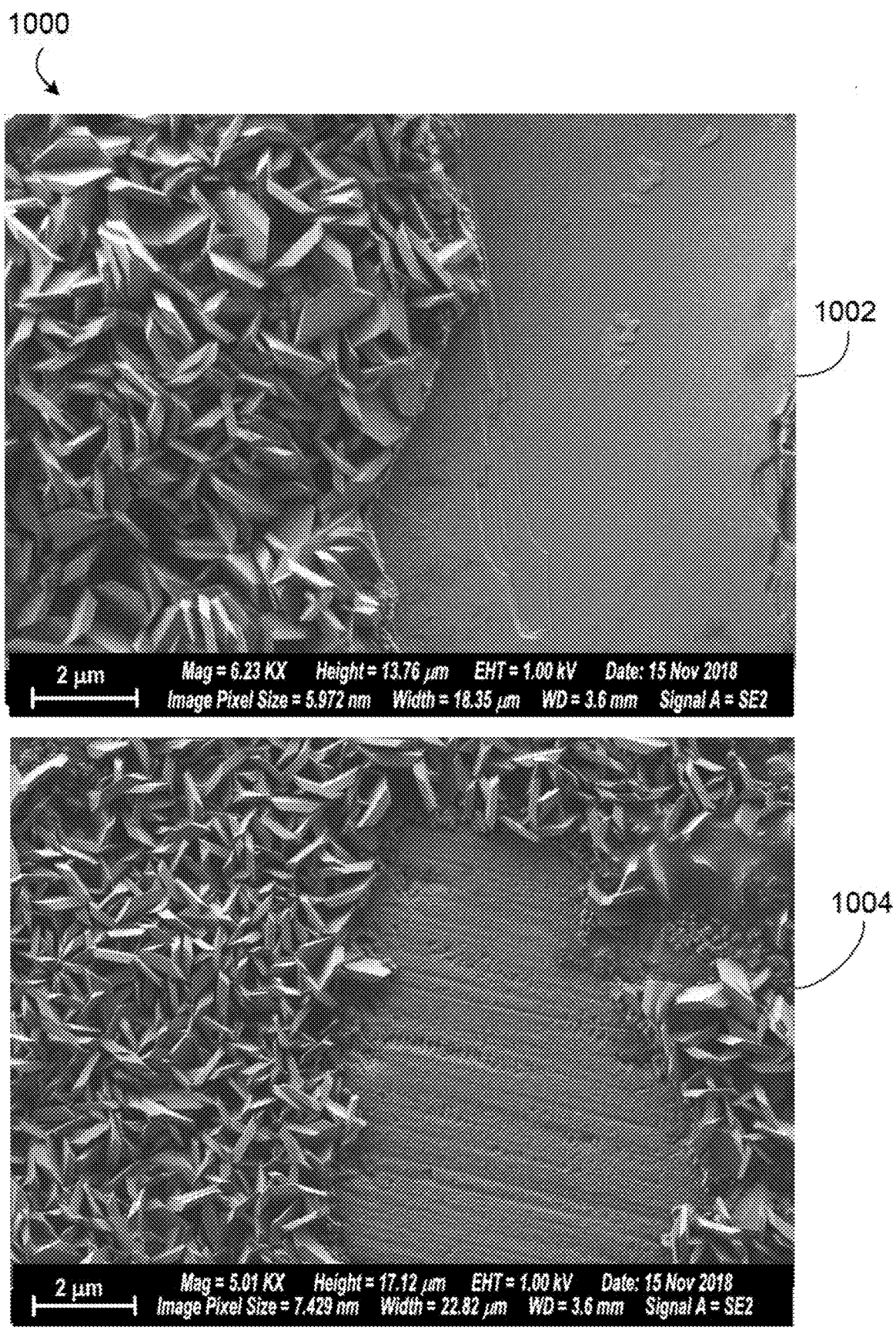
FIG. 10 is an SEM image depicting a portion of the jarosite layer stripped from the surface of the treated shale-rock sample of Example 1.
Figure 11:
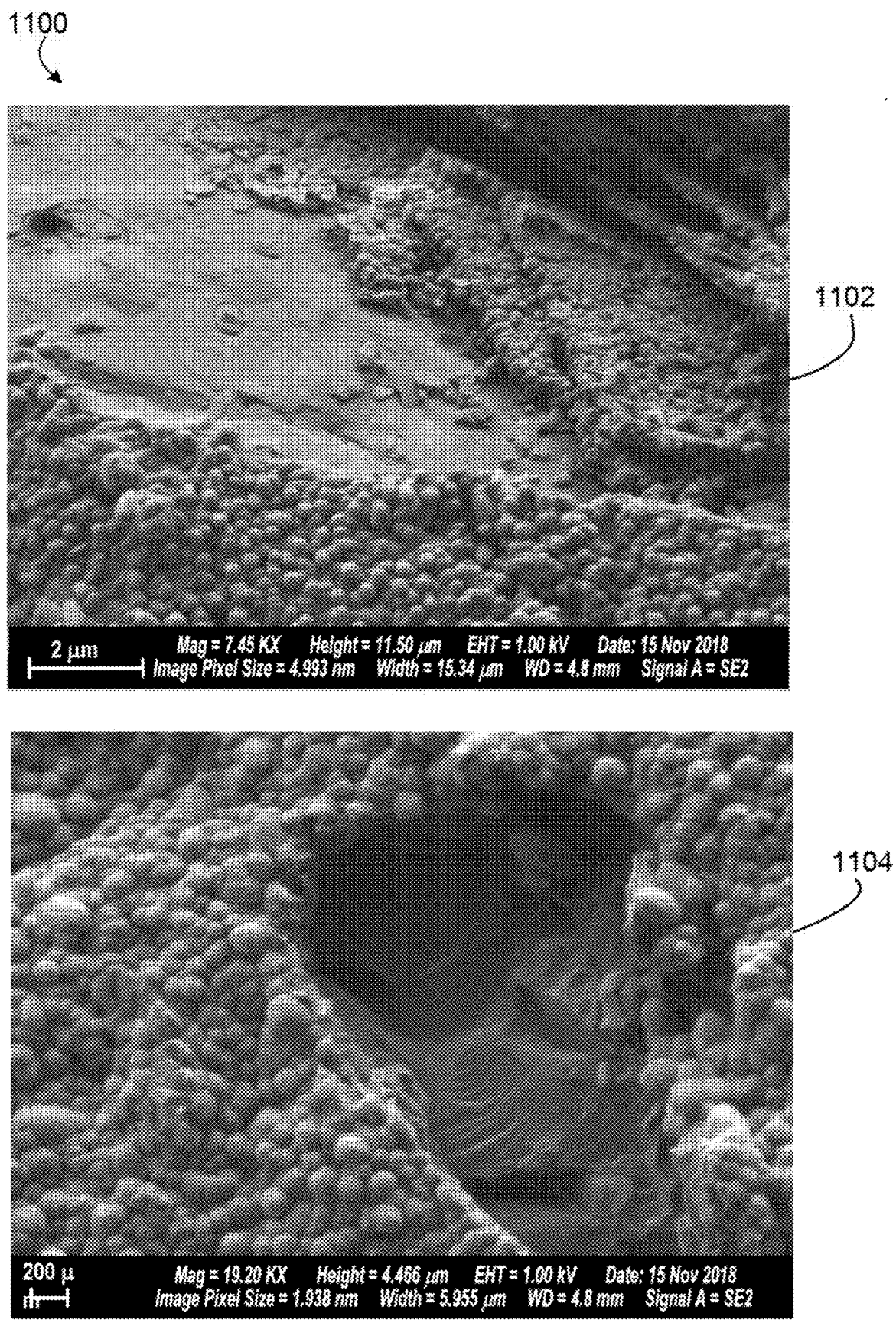
FIG. 11 is an SEM image depicting a portion of the hematite layer stripped from the surface of the treated shale-rock sample of Example 2.

Evaluation of thickness determination of petrogenic proppant for Examples 1 and 2 was performed. Scotch tape (analogous to Scotch™ tape) was pressed to the surface of treated shale rock A (Example 1) and treated shale rock B (Example 2), as shown in FIGS. 10 and 11, respectively. Application of the scotch tape took the surface material in some places to facilitate determination of thickness of the surface material (grown mineral). For shale A (Example 1), the jarosite was no thicker than 2 μm. For shale B (Example 2), the hematite was found to be no thicker than 500 nm.

FIG. 10 is an SEM image 1000 at two magnifications 1002 and 1004 depicting a portion of the jarosite layer stripped via scotch tape from the surface of the treated shale-rock sample (shale type A) of Example 1. The formed jarosite had a thickness of 2 μm or less.

FIG. 11 is an SEM image 1100 at two magnifications 1102 and 1104 showing a portion of the hematite layer stripped by scotch tape from the surface of the treated shale-rock sample (shale type B) of Example 2. The formed hematite had a thickness of 500 nm or less.

Table 1 gives the mineralogy of the shale rock types A and B used in the Examples. These shale rocks have 1 wt % or less of pyrite. Other shales can have greater pyrite content up to 14 wt % or greater.

TABLE 1

Mineralogy weight percent of Shales Types A and B for Shale Rock Samples

|  | Shale Type A | Shale Type B |
| --- | --- | --- |
| Quartz | 72 | 30 |
| Albite | 5 | 9 |
| Orthoclase | 1 | 2 |
| Chlorite (IIB) | 1 | 9 |
| Illite and Mica | 15 | 35 |
| Illite/Smectite | 4 | 7 |
| Pyrite | 1 | Trace |
| Anatase | Trace | 2 |
| Siderite | 0 | 5 |
| Kaolinite | Trace | 1 |
| Gypsum | Trace | 0 |
| Dolomite | 1 | 0 |

Present embodiments of in-situ proppant generation including with respect to the surface-directed formation of proppant can make relatively small proppant (for example, less than 2 μm). This "petrogenic proppant" or proppant originating from the rock can provide advantages. This new proppant can be formed where traditional proppant cannot go. The proppant formed in-situ from rock can make deeper (for example, at least 50 feet from the wellbore) parts of fractures conductive to hydrocarbons and thus improve (increase) the stimulated reservoir volume. The petrogenic proppant is produced from elements within the rock. The amount of traditional proppant used in a well may be decreased. Furthermore, the technique may create porosity in rock by leaching out the elements that become the petrogenic proppant from the rock. This increase in rock porosity can boost permeability as well. The presence of both the petrogenic proppant and the increased porosity can increase hydrocarbon recovery. Hydrocarbon recovery is increased because the petrogenic proppant keeps small fractures open which enhances conductivity and the increased rock porosity enhances flow of hydrocarbons from the formation into the fractures.

In addition, there may be less pressure dependent leak-off as secondary fractures will remain open upon cessation of the frac job (and abatement of the pressure used to frack), allowing water to return to the surface. Another advantage is that the in-situ formed mineral may provide for harder fractures faces that will decrease embedment by externally pumped proppants. The externally pumped proppant embedding into the fracture faces instead of propping open the fracture can decrease conductivity. Lastly, while the present discussion has focused at times on including the oxidizer in the fracturing fluid, the oxidizer and other chemical components for in-situ formation of proppant can be included in a pumped treatment fluid after fracturing and without hydraulic fracturing occurring while the petrogenic proppant is formed.

Figure 12:
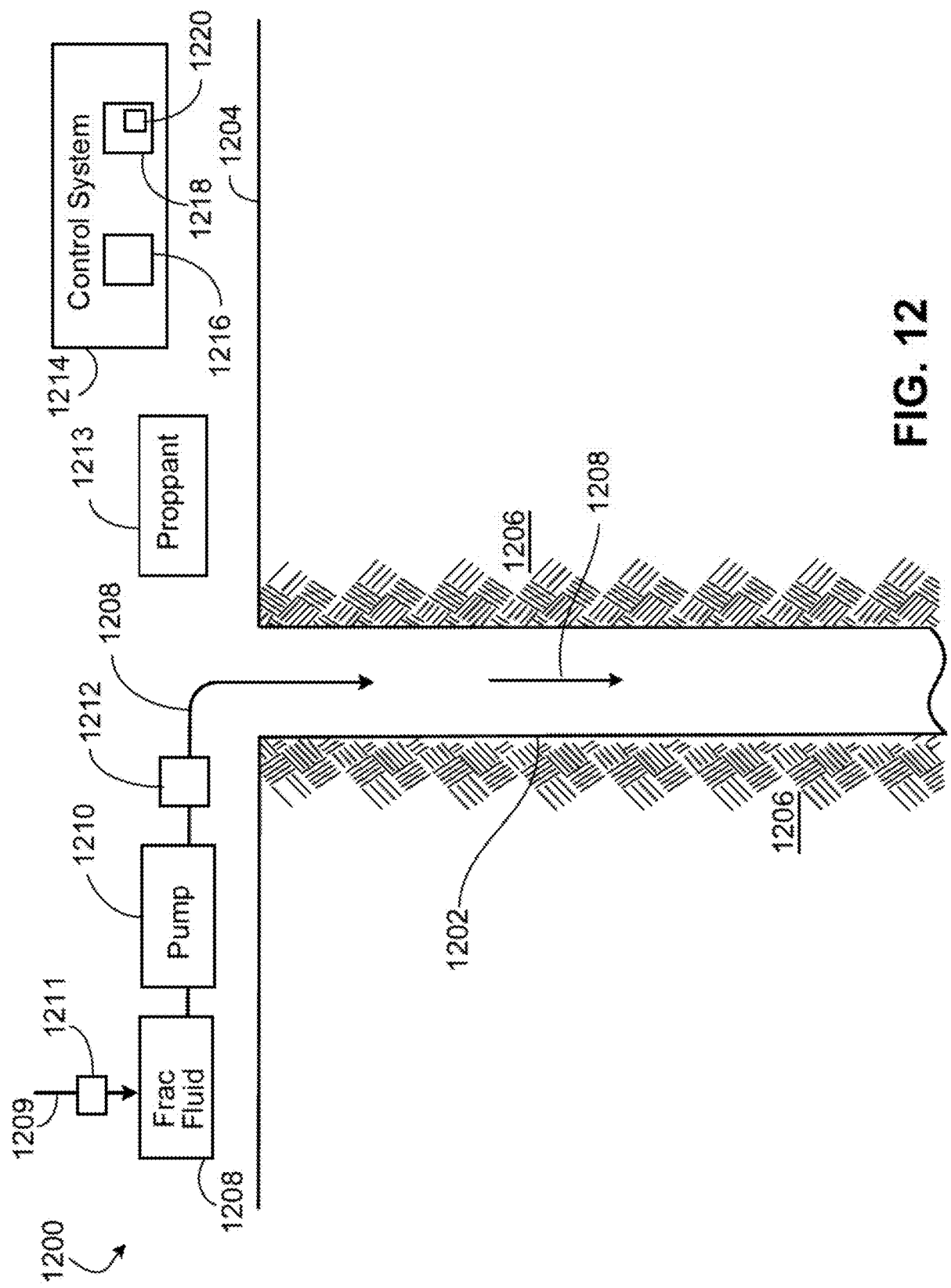
FIG. 12 is a diagram of a well site having a wellbore formed through the Earth surface into a geological formation in the Earth crust.

FIG. 12 is a well site 1200 having a wellbore 1202 formed through the Earth surface 1204 into a geological formation 1206 in the Earth crust. The wellbore 1202 can be vertical, horizontal, or deviated. The wellbore 1202 can be openhole but is generally a cased wellbore. The annulus between the casing and the formation 1206 may be cemented. Perforations may be formed through the casing and cement into the formation 1206. The perforations may allow both for flow of fracturing fluid into the geological formation 1206 and for flow of produced hydrocarbon from the geological formation 1206 into the wellbore 1202 to the surface 1204.

The well site 1200 may have a hydraulic fracturing system including a source of fracturing fluid 1208 at the Earth surface 1204 near or adjacent the wellbore 1202. The fracturing fluid 1208 may be labeled as frac fluid, fracing fluid, or fracking fluid. The fracturing fluid 1208 source may include one or more vessels holding the fracturing fluid 1208. The fracturing fluid 1208 may be stored in vessels or containers and including on trucks in some implementations. In certain implementations, the fracturing fluid 1208 is slickwater that may be primarily water (for example, at least 98.5% water by volume). The fracturing fluid 1208 can be other water-based treatment fluid. The fracturing fluid 1208 can be prepared from seawater. The fracturing fluid 1208 can also be gel-based fluids. In addition, the fracturing fluid 1208 can include polymers and surfactants. Other common additives may include hydrochloric acid, friction reducers, emulsion breakers, and emulsifiers.

The hydraulic fracturing system at the well site 1200 may include motive devices such as one or more pumps 1210 to pump (inject) the fracturing fluid 1208 through the wellbore 1202 into the geological formation 1206. The pumps 1210 may be, for example, positive displacement pumps, and arranged in both series and parallel. Again, the wellbore 1202 may be a cemented cased wellbore and have perforations for the fracturing fluid 1208 to flow (injected) into the formation 1206. In some examples, the speed of the pumps may be controlled to give desired flow rate of the fracturing fluid 1208. The system may include a control component 1212 to modulate or maintain the flow of fracturing fluid 1208 into the wellbore 1202 for the hydraulic fracturing and treatment to form jarosite or proppant in situ. The control component 1212 may be, for example, a control valve(s). In some implementations, the control component 1212 may be the pump(s) 1210 as a metering pump in which speed of the pump 1210 is controlled to give the specified flow rate of the fluid 1208. The set point of the control component 1212 may be specified or driven by a control system 1214. Fractures (for example, FIG. 2) may be formed via hydraulically fracturing by the pumped fracturing fluid 1208. Proppant may be grown in-situ (via the fracturing fluid) in the fractures from elements in the fractured rock.

In accordance with present embodiments, the fracturing fluid 1208 may include an oxidizer 1209 to form mineral or proppant in situ in the geological formation 1206, as discussed earlier. In certain embodiments, the oxidizer 1209 may include bromate and persulfate $S_2O_8^{2-}$. The fracturing fluid 1208 having the oxidizer 1209 may oxidize rock in the geological formation 1206, as discussed. The mineral may form (for example, via hydrothermal synthesis) and precipitate in situ from the ions in the fracturing fluid 1208 via the conditions (for example, temperature) of the formation 1206. The oxidizing or treating of the pyrite or rock via the oxidizer 1209 may grow mineral in fractures in the geological formation 1206. The formed mineral may act as a proppant, as discussed. The formed proppant may deposit or grow in microfractures and relatively deep (far field) into the fractures. In some embodiments, the formed mineral may form as a layer (for example, less than 50 μm thickness) on fracture faces to prevent or reduce embedment of traditional proppant. The oxidizer 1209 may include bromate, potassium chloride, chlorate, sulfate $SO_4^{2-}$, or persulfate, or any combinations thereof. In some implementations, the water to prepare the fracturing fluid 1208 may be seawater typically having $SO_4^{2-}$ content.

In operation for certain implementations, the amount of the oxidizer 1209 incorporated into the fracturing fluid 1208 may be modulated via a control component 1211 (for example, a control valve or metering pump). The amount of oxidizer 1209 added to the fracturing fluid 1208 may be altered to adjust concentration of the oxidizer 1209 in the fracturing fluid 1208 to adjust the amount or a property (for example, density) of the mineral or mineral matrix formed in the geological formation 1206. The control component 1211 may also provide for starting and stopping addition of the oxidizer 1209 to the fracturing fluid 1208. In particular implementations, the oxidizer 1209 may generally be included in the fracturing fluid 1208 during a first portion of the hydraulic fracturing job, such as in the range of the first 1 to 4 hours (for example, first 2 or 3 hours). In certain implementations, the additive 1209 is included in the fracturing fluid 1208 prior to addition of external proppant to the fracturing fluid 1208.

The hydraulic fracturing system at the well site 1200 may have a source 1213 of proppant (for example, sand) which can include railcars, hoppers, containers, or bins having ceramic proppants or sand of differing mesh size (particle size). The source 1213 of external proppant may be at the Earth surface 1204 near or adjacent the wellbore 1202. The fracturing fluid 1208 may include externally-provided proppant. In some examples, the proppant may be added (for example, via gravity) to a conduit conveying the fracturing fluid 1208 such as at a suction of a fracturing fluid pump 1210. The hydraulic fracturing system may include a feeder or blender to receive a proppant (for example, sand) and discharge the proppant into a conduit conveying the fracturing fluid 1208. Thus, the fracturing fluid 1208 may be a slurry that is a combination of the fracturing treating fluid and proppant. For instances when proppant (for example, from source 1213) is not added to the fracturing fluid, the fracturing fluid 1208 entering the wellbore 1202 for the hydraulic fracturing and treating may be the fracturing fluid without proppant. Fracturing fluid of less viscosity (for example, less than 100 cP) or greater viscosity (for example, greater than 100 cP) may be employed in the hydraulic fracturing.

The frac rates may include a clean rate which is flow rate of fracturing fluid fluid without proppant, a slurry rate which may be a flow rate of a fracturing fluid slurry of the fluid (for example, a thicker or more viscous fracing fluid of greater than 100 cP) and proppant. In particular implementations, the frac rates or parameters adjusted may include at least two variables which are fracing-fluid pump(s) rate and proppant (for example, sand) concentration in the fracing fluid. Frac operations can be manual and guided with controllers and software.

The control system 1214 may direct operation of the hydraulic fracturing system and the addition of the oxidizer 1209 to the fracturing fluid 1208 in particular. The control system 1214 may include one or more controllers. The control system 1214 may include a hardware processor 1216 and memory 1218 storing code 1220 (for example, logic and instructions) executed by the processor to direct operations. For instance, the control system 1214 may specify the set point of the control component 1211 (to maintain or adjust concentration of the oxidizer 1209 in the fracturing fluid 1208) to maintain or adjust a property (for example, density or permeability) of the mineral formed in situ in the geological formation 1206. Moreover, the control system 1214 responsive, for example, to the timing of the hydraulic fracturing may send an alert to change the composition of the oxidizer 1209 to affect a property of the mineral formed in-situ. In some examples, the control system 1214 may direct an additive system (not shown) to alter the composition of the oxidizer 1209.

The processor 1216 may be one or more processors, and may have one or more cores. The hardware processor(s) 1216 may include a microprocessor, a central processing unit (CPU), a graphics processing unit (GPU), or other circuitry. The memory 1218 may include volatile memory (for example, cache and random access memory or RAM), nonvolatile memory (for example, hard drive, solid-state drive, and read-only memory (ROM)), and firmware. The control system 1214 may include a field computer, remote computer, laptop computer, a desktop computer, a programmable logic controller (PLC), a distributed control system (DCS), control card or circuitry. The control system 1214 or associated computing system may direct the in situ formation of mineral or proppant and is therefore unconventional.

The control component 1211 (for example, as directed by the control system 1214) may adjust the timing of the injected fracturing treatment fluid 1208 as having the oxidizer 1209 to generate a mineral matrix in-situ having a "spatial gradient" that provides a variance of permeability between near wellbore to far field fracturing. The timing or concentration of the oxidizer 1209 in the fracturing fluid 1208 may be adjusted for growing mineral in-situ of varying heights and geometries, for example, at larger mesh in near wellbore (for example, mineral of greater than 150-μm particle size) to smaller mesh in far field (for example, mineral of less than 150-μm particle size). In a particular implementation, the control system 1214 may direct the control component 1211 to alter flow rate and thus adjusting the composition of the treatment fluid 1208 to generate a mineral matrix of varying packing density to provide a varying permeability from near wellbore to far-field fracturing application.

An embodiment is a hydraulic fracturing system including a vessel holding a fracturing fluid. A pump (or plurality of pumps) provides the fracturing fluid from the vessel through a wellbore into a geological formation to hydraulically fracture rock in the geological formation to generate fractures in the geological formation. The pump may be, for example, a positive displacement pump. The system includes a control component (for example, control valve or metering pump) to modulate an addition rate of an oxidizer to the fracturing fluid in the vessel. A control system adjusts a set point of the control component to change a concentration of the additive in the fracturing fluid in response to a timing of the hydraulic fracturing and/or to alter a property of a mineral matrix formed in the fracture via the fracturing fluid. In some implementations, the property adjusted is packing density or permeability of the mineral matrix. The mineral matrix may be a petrogenic proppant matrix.

Figure 13:
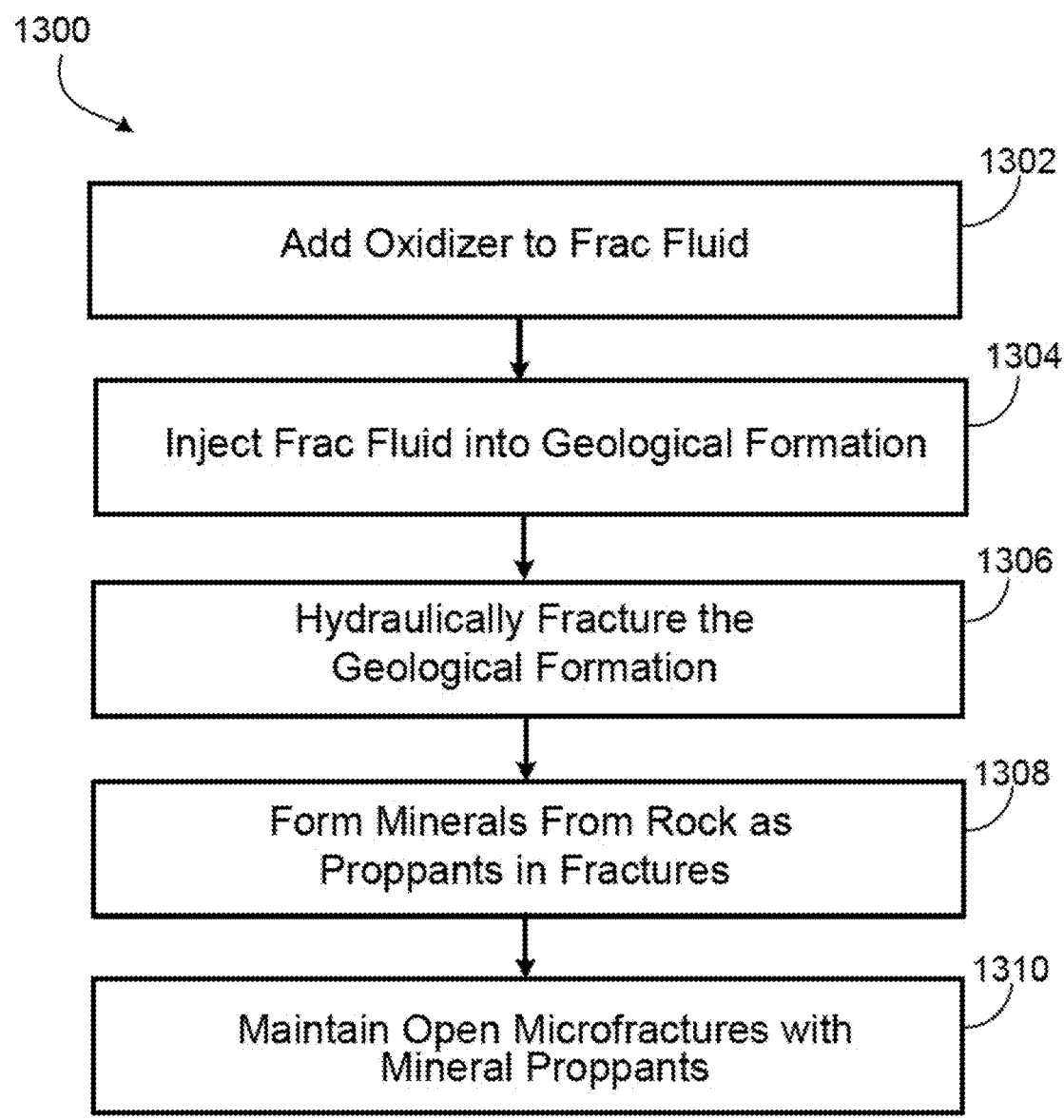
FIG. 13 is a block flow diagram of a method of forming mineral (for example, as a proppant) in a geological formation.

FIG. 13 is a method 1300 of forming mineral (for example, as a proppant) in a geological formation. The method may including forming the material as proppant in situ in the geological formation, such as in fractures in rock in the geological formation. The proppant may aid in maintaining fractures open in the geological formation. The proppant may be labeled as a petrogenic proppant that is proppant formed from the rock (via the fracturing fluid). The mineral may also be formed as a layer on fracture faces to protect against embedment of traditional proppant (externally pumped and conveyed) into the fracture faces.

At block 1302, the method includes incorporating an oxidizer (for example, oxidizer 909) in fracturing fluid for forming the mineral in the geological formation. As discussed, the additive may include, for example, bromate and sulfate. The timing or amount of oxidizer may be adjusted to alter properties of the mineral or proppant formed in situ in the geological formation.

At block 1304, the method includes injecting the fracturing fluid (which may have the oxidizer) through a wellbore into the geological formation. For example, the fracturing fluid may be pumped into the wellbore. For the wellbore as a cemented cased wellbore, perforations through the casing and cement may facilitate introduction or injection of the fracturing fluid from the wellbore into the geological formation. For certain time periods of the hydraulic fracturing, the fracturing fluid may include proppant such as sand.

At block 1306, the method includes hydraulically fracturing the geological formation with the fracturing fluid. The fracturing may increase the subsequent production of hydrocarbon (for example, crude oil and natural gas) from the geological formation. The fracturing may include primary fractures and smaller secondary fractures. The fractures may include microfractures. As indicated, the hydraulic fracturing may include the introduction of traditional proppant such as sand.

At block 1308, the method includes forming a mineral or mineral proppant in situ in the geological formation from rock in the geological formation via the fracturing fluid. As discussed, the fracturing fluid may form (from the rock) a mineral proppant or mineral layer in fractures in the geological formation. The mineral may precipitate from the fracturing fluid onto rock in the geological formation, such as onto fracture faces. The oxidizer may leach ions from the rock into the fracturing fluid (or formation fluid) and the mineral is then hydrothermally synthesized and deposited on the rock.

At block 1310, the method includes maintaining open hydraulic fractures including primary fractures and secondary fractures, which may include microfractures, and nanofractures, with the mineral proppants formed in situ. See, for example, FIG. 2. The fractures are held open by the mineral or petrogenic proppant after the hydraulic fracturing is complete and thus facilitating increased flow of hydrocarbons from the geological formation to the wellbore.

An embodiment is a method of forming proppant in-situ in a geological formation. The method includes injecting a fracturing fluid through a wellbore into the geological formation and hydraulically fracturing the geological formation with the fracturing fluid to generate fractures in the geological formation. The method includes forming proppant in situ in the fractures via the fracturing fluid. The proppant is formed from rock in the geological formation. The proppant may be a mineral grown on the rock via the fracturing fluid. In particular implementations, the fractures include nanofractures having a fracture width less than 1 μm. The proppant is formed in situ in the nanofractures. The fractures may include microfractures having a fracture width less than 100 μm. The proppant is formed in situ in the microfractures. The proppant is a mineral formed from the rock via the fracturing fluid. The forming of the proppant may involve leaching iron and sulfur from the rock into the fracturing fluid and hydrothermally converting the iron and the sulfur in the fracturing fluid to a mineral. Again, the proppant may be a mineral formed or grown on the rock via the fracturing fluid. The mineral can include, for example, hematite, jarosite, lepidocrocite, or ferrihydrite, or any combinations thereof. For the proppant as a mineral, the forming of the proppant in situ in the fractures may include depositing the mineral on the rock in the fractures via the fracturing fluid. In some implementations, the proppant as a mineral (for example, an iron-based mineral) has a particle size in a range of 200 nanometers (nm) to 2 micrometers (μm). In certain implementations, the forming of the proppant in situ in the fractures includes oxidizing the rock via an oxidizer in the fracturing fluid. The oxidizing of the rock may give $Fe^{3+}$ ions and $SO_4^-$ ions into the fracturing fluid. The proppant may be a mineral matrix. The oxidizing may involve oxidative leaching of the rock to give ions into the fracturing fluid. In that case, the forming of the proppant (mineral) in situ in the fractures may involve growing a mineral on the rock in the fractures via hydrothermal synthesis of the ions. The hydrothermal synthesis can include precipitating the mineral as a crystalline material on the rock. The oxidizing of the rock may include oxidative leaching of the rock giving $Fe^{3+}$ ions and to $SO_4^-$ ions into the fracturing fluid. The fracturing fluid may have an oxidizer including bromate, sodium bromate, persulfate, or ammonium persulfate, or any combinations thereof. The forming of the proppant can involve oxidizing the rock via the oxidizer in the fracturing fluid to grow the proppant on the rock in the fractures.

Another embodiment is a method of forming a mineral in a geological formation. The method includes pumping a fracturing fluid through a wellbore into the geological formation and hydraulically fracturing the geological formation with the fracturing fluid to generate fractures in the geological formation. The method includes forming the mineral on rock in the fractures. The mineral is formed from the rock via the fracturing fluid. The rock may include siderite, pyrite, pyrrhotite, chlorite group minerals, chamosite, clays illite, marcasite, mica, or ankerite, or any combinations thereof. The mineral formed may act as a proppant. The mineral formed may be mineral grains grown on a surface of the rock by tandem oxidative leach-hydrothermal synthesis via the fracturing fluid. The rock may include iron-containing shale. The mineral formed may include an iron oxyhydroxide group mineral or a sulfate group mineral, or a combination thereof. The forming of the mineral on the rock may include forming a layer of the mineral on faces of the fractures to protect against embedment by traditional proppant. The forming of such a layer may include precipitating the mineral (for example, an Fe(III)-based mineral) on the faces of the fractures. The layer may have a thickness of less than 50 microns (μm).

Yet another embodiment is a method of forming proppant in-situ in a geological formation. The method includes injecting a fracturing fluid through a wellbore into the geological formation and hydraulically fracturing rock in the geological formation with the fracturing fluid to generate fractures in the geological formation. The method includes leaching ions from the rock via the fracturing fluid and forming the proppant from the ions. The forming of the proppant from the ions may involve hydrothermal synthesis. The proppant may be petrogenic proppant formed from the rock. The proppant may be a mineral and where forming the proppant includes precipitating hydrothermally the mineral. The fracturing fluid may generally include an oxidizer and where the leaching may include oxidative leaching. The forming of the proppant may include synthesizing the proppant from the ions. The forming of the proppant may involve nucleating and growing a mineral on the rock and where the proppant includes the mineral.

Yet another embodiment is a method of forming proppant in situ in a geological formation. The method includes injecting a fracturing fluid through a wellbore into the geological formation and hydraulically fracturing rock in the geological formation with the fracturing fluid to generate fractures in the geological formation. The method includes forming proppant in situ in the fractures by oxidative leaching of the rock via the fracturing fluid. The forming of the proppant in situ in the fractures may involve growing a mineral on the rock in the fractures via the fracturing fluid and where the proppant includes the mineral. The forming of the proppant may include precipitating the proppant on the rock from the fracturing fluid. Such precipitating of the proppant on the rock can include depositing the proppant as crystallites on faces of the fractures. The forming of the proppant may include hydrothermal synthesis of the proppant and precipitation of the proppant on the rock. The synthesis and the precipitation may be contemporaneous. This precipitation on the rock may include precipitation of a mineral as the proppant on faces of the fractures and where the proppant is a petrogenic proppant matrix.

A number of implementations have been described. Nevertheless, it will be understood that various modifications may be made without departing from the spirit and scope of the disclosure.

What is claimed is:

1. A method of forming proppant in-situ in a geological formation, comprising:
    injecting a fracturing fluid through a wellbore into the geological formation;
    hydraulically fracturing the geological formation with the fracturing fluid to generate fractures in the geological formation; and
    forming proppant in situ in the fractures via the fracturing fluid, wherein the proppant is formed from rock in the geological formation comprising leaching iron from the rock into the fracturing fluid and hydrothermally converting the iron in the fracturing fluid to a mineral.

2. The method of claim 1, wherein forming the proppant comprises hydrothermally converting the iron and sulfur in the fracturing fluid to the mineral.

3. The method of claim 1, comprising adjusting an amount of oxidizer in the fracturing fluid to alter a property of the mineral, wherein forming the proppant is contemporaneous with the hydraulic fracturing, and wherein the proppant comprises the mineral formed on the rock via the fracturing fluid.

4. The method of claim 3, wherein the property comprises size of mineral grains of the mineral, and wherein the mineral comprises hematite, jarosite, lepidocrocite, or ferrihydrite, or any combinations thereof.

5. The method of claim 1, wherein the proppant comprises the mineral, and wherein forming the proppant in situ in the fractures comprises depositing the mineral on the rock in the fractures via the fracturing fluid.

6. The method of claim 5, wherein the proppant comprising the mineral comprises a particle size in a range of 200 nanometers (nm) to 2 micrometers (μm).

7. The method of claim 1, wherein forming the proppant in situ in the fractures comprises oxidizing the rock via an oxidizer in the fracturing fluid, and wherein the oxidizing comprises the leaching the iron from the rock.

8. The method of claim 7, wherein the oxidizing comprises oxidative leaching of the rock to give ions comprising the iron as iron ions into the fracturing fluid.

9. The method of claim 8, wherein forming the proppant in situ in the fractures comprises growing the mineral on the rock in the fractures via the hydrothermally converting comprising hydrothermal synthesis of the ions, and wherein the proppant comprises the mineral.

10. The method of claim 9, wherein the hydrothermal synthesis comprises precipitating the mineral as a crystalline material on the rock.

11. The method of claim 7, wherein oxidizing the rock comprises oxidative leaching of the rock giving the iron comprising $Fe^{3+}$ ions into the fracturing fluid.

12. The method of claim 1, wherein the leaching is contemporaneous with the hydraulic fracturing, wherein the fractures comprise microfractures having a fracture width less than 100 microns (μm), wherein the proppant is formed in situ in the microfractures, and wherein the proppant comprises the mineral formed from the rock via the fracturing fluid.

13. The method of claim 1, wherein the proppant comprises the mineral grown on the rock via the fracturing fluid, wherein the fractures comprise nanofractures having a fracture width less than 1 μm, and wherein the proppant is formed in situ in the nanofractures.

14. The method of claim 4, wherein the mineral grains near-wellbore comprise a particle size of at least 150 micrometers (μm), wherein than the mineral grains far-field comprise a particle size less than 150 μm, wherein the fracturing fluid comprises an oxidizer comprising bromate, sodium bromate, persulfate, or ammonium persulfate, or any combinations thereof, and wherein forming the proppant comprises the leaching comprising oxidizing the rock via the oxidizer in the fracturing fluid to grow the proppant comprising the mineral on the rock in the fractures via the hydrothermally converting of the iron in the fracturing fluid to the mineral.

15. The method of claim 14, wherein oxidizing the rock gives the iron comprising $Fe^{3+}$ ions into the fracturing fluid, and wherein the proppant comprises the mineral comprising a mineral matrix.

16. A method of forming a mineral in a geological formation, comprising:
pumping a fracturing fluid through a wellbore into the geological formation;
hydraulically fracturing the geological formation with the fracturing fluid to generate fractures in the geological formation; and
forming the mineral on rock in the fractures, wherein the mineral is formed from the rock by tandem oxidative leach-hydrothermal synthesis via the fracturing fluid, and wherein the rock comprises siderite, pyrite, pyrrhotite, chlorite group minerals, chamosite, clays illite, marcasite, mica, or ankerite, or any combinations thereof.

17. The method of claim 16, wherein forming the mineral on the rock comprises forming a layer of the mineral on faces of the fractures to protect against embedment by external proppant pumped and conveyed into the fractures.

18. The method of claim 17, wherein forming the layer comprises precipitating the mineral on the faces of the fractures, wherein the mineral comprises a Fe(III)-based mineral, and wherein the layer comprises a thickness of less than 50 microns (μm).

19. The method of claim 16, wherein the mineral formed acts as a proppant and comprises mineral grains grown on a surface of the rock by the tandem oxidative leach-hydrothermal synthesis via the fracturing fluid, and wherein the tandem oxidative leach-hydrothermal synthesis is contemporaneous with the hydraulic fracturing.

20. The method of claim 16, wherein the rock comprises iron-containing shale, and wherein the mineral formed comprises an iron oxyhydroxide group mineral or a sulfate group mineral, or a combination thereof.

21. A method of forming proppant in-situ in a geological formation, comprising:
injecting a fracturing fluid through a wellbore into the geological formation;
hydraulically fracturing rock in the geological formation with the fracturing fluid to generate fractures in the geological formation;
leaching ions from the rock via the fracturing fluid contemporaneous with the hydraulic fracturing; and
forming the proppant from the ions.

22. The method of claim 21, wherein the fracturing fluid comprises an oxidizer, wherein the leaching comprises oxidative leaching, and wherein forming the proppant comprises synthesizing the proppant from the ions.

23. The method of claim 21, wherein forming the proppant comprises nucleating and growing a mineral on the rock, and wherein the proppant comprises the mineral.

24. The method of claim 21, wherein forming the proppant from the ions comprises hydrothermal synthesis, and wherein the proppant comprises petrogenic proppant formed from the rock.

25. The method of claim 21, wherein the proppant comprises a mineral, wherein forming the proppant comprises precipitating hydrothermally the mineral, and wherein the method comprises altering size of mineral grains of the mineral by adjusting an amount of oxidizer in the fracturing fluid or altering packing density of the mineral matrix by adjusting the amount of the oxidizer in the fracturing fluid, or a combination thereof.

26. A method of forming proppant in situ in a geological formation, comprising:
injecting a fracturing fluid through a wellbore into the geological formation;
hydraulically fracturing rock in the geological formation with the fracturing fluid to generate fractures in the geological formation;
forming proppant in situ in the fractures by oxidative leaching of the rock via the fracturing fluid; and
adjusting an amount of oxidizer in the fracturing fluid to alter mesh size of the proppant or to alter packing density of the proppant, or a combination thereof.

27. The method of claim 26, wherein forming the proppant in situ in the fractures comprises growing a mineral on the rock in the fractures via the fracturing fluid, wherein the proppant comprises the mineral.

28. The method of claim 26, wherein forming the proppant comprises precipitating the proppant on the rock from the fracturing fluid.

29. The method of claim 28, wherein precipitating the proppant on the rock comprises depositing the proppant as crystallites on faces of the fractures.

30. The method of claim 26, wherein forming the proppant comprises hydrothermal synthesis of the proppant.

31. The method of claim 30, wherein forming the proppant is contemporaneous with the hydraulic fracturing of the rock, and wherein forming the proppant comprises precipitation of the proppant on the rock.

32. The method of claim 31, wherein the precipitation on the rock comprises precipitation of a mineral as the proppant on faces of the fractures, and wherein the proppant comprises a petrogenic proppant matrix.

33. A hydraulic fracturing system comprising:
a vessel holding a fracturing fluid;
a pump to provide the fracturing fluid from the vessel through a wellbore into a geological formation to hydraulically fracture rock in the geological formation to generate fractures in the geological formation and to form a mineral matrix in the fractures via the fracturing fluid comprising an oxidizer;

a control component to alter an addition rate of the oxidizer to the fracturing fluid; and a control system to specify a set point of the control component to change a concentration of the oxidizer in the fracturing fluid to alter a property of the mineral matrix formed in the fractures via the fracturing fluid, wherein the mineral grains near-wellbore have a particle size of at least 150 micrometers (μm), and wherein than the mineral grains far-field have a particle size less than 150 μm.

34. The system of claim 33, wherein the property comprises permeability of the mineral matrix.

35. The system of claim 33, wherein the control component comprises a control valve or a metering pump, wherein to hydraulically fracture and to form the mineral matrix are performed contemporaneously, and wherein the mineral matrix comprises a petrogenic proppant matrix.

36. The method of claim 16, comprising altering size of mineral grains of the mineral by adjusting an amount of oxidizer in the fracturing fluid.

37. The method of claim 36, wherein altering the size of the mineral grains gives the mineral grains near-wellbore larger than the mineral grains far-field.

38. The method of claim 16, comprising altering packing density of a mineral matrix of the mineral by adjusting an amount of oxidizer in the fracturing fluid.

39. The method of claim 38, wherein altering the packing density comprises varying the packing density from near-field to far-field.

* * * * *